(12) United States Patent
Sharma et al.

(10) Patent No.: US 10,965,596 B2
(45) Date of Patent: *Mar. 30, 2021

(54) HYBRID SERVICES INSERTION

(71) Applicant: Cisco Technology, Inc., San Jose, CA (US)

(72) Inventors: Samar Sharma, San Jose, CA (US); Pavani Baddepudi, San Jose, CA (US); Goran Saradzic, Erie, CO (US); Manjunath Masanagi, Bangalore (IN); Mahadeva S. Chandra, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,226

(22) Filed: Sep. 19, 2018

(65) Prior Publication Data

US 2019/0104065 A1 Apr. 4, 2019

Related U.S. Application Data

(60) Provisional application No. 62/568,017, filed on Oct. 4, 2017.

(30) Foreign Application Priority Data

Oct. 4, 2017 (IN) .............................. 201741035135

(51) Int. Cl.
*H04L 12/741* (2013.01)
*H04L 12/725* (2013.01)
(Continued)

(52) U.S. Cl.
CPC ........ *H04L 45/745* (2013.01); *H04L 41/0893* (2013.01); *H04L 45/306* (2013.01);
(Continued)

(58) Field of Classification Search
CPC . H04L 45/745; H04L 41/0893; H04L 45/306; H04L 45/54; H04L 47/2475;
(Continued)

(56) References Cited

U.S. PATENT DOCUMENTS 6,175,874 B1 1/2001 Imai et al.
6,182,097 B1 1/2001 Hansen et al.
(Continued)

OTHER PUBLICATIONS

Samar Sharma, "Catena", https://blogs.cisco.com/datacenter/catena, Mar. 27, 2017, 8 pages.
(Continued)

*Primary Examiner* — Hardikkumar D Patel
(74) *Attorney, Agent, or Firm* — Edell, Shapiro & Finnan, LLC

(57) ABSTRACT

In an embodiment, a method is provided. The method includes: storing, in at least one hardware module of a network device having a plurality of ports, attributes for at least one access control list and associated actions that cause network packets received at one of the plurality of ports that match the attributes for the at least one access control list, to be directed into a service chain that includes at least a first network processing application specified according to a port and a second network processing application specified according to an internet protocol (IP) address; and directing a received network packet that matches the attributes for the at least one access control list into the service chain.

20 Claims, 24 Drawing Sheets

(51) Int. Cl.
*H04L 12/859* (2013.01)
*H04L 29/06* (2006.01)
*H04L 12/24* (2006.01)
*H04L 12/931* (2013.01)
*H04L 29/12* (2006.01)

(52) U.S. Cl.
CPC .......... *H04L 45/54* (2013.01); *H04L 47/2475* (2013.01); *H04L 49/35* (2013.01); *H04L 63/101* (2013.01); *H04L 69/22* (2013.01); *H04L 61/103* (2013.01); *H04L 61/2514* (2013.01); *H04L 61/6022* (2013.01)

(58) Field of Classification Search
CPC ....... H04L 49/35; H04L 63/101; H04L 69/22; H04L 61/103; H04L 61/2514; H04L 61/6022; H04L 41/145; H04L 41/0873; H04L 41/0866; H04L 41/12; H04L 41/0853; H04L 41/147; H04L 41/142; H04L 41/0631; H04L 43/0823; H04L 43/10; H04L 41/16; H04L 41/0654; H04L 41/22; H04L 41/50; H04L 45/22; H04L 45/28; H04L 45/38; H04L 45/42; H04L 45/64; H04L 63/20; H04L 12/4641; H04L 41/0266; H04L 41/06; H04L 41/0677; H04L 41/0681; H04L 41/08; H04L 41/0806; H04L 41/082; H04L 41/0823; H04L 41/0886; H04L 41/5054; H04L 43/04; H04L 45/02; H04L 63/0209; H04L 63/1425; H04L 12/1407; H04L 41/0233; H04L 41/044; H04L 41/046; H04L 41/0604; H04L 41/0613; H04L 41/0618; H04L 41/0636; H04L 41/064; H04L 41/0668; H04L 41/0686; H04L 41/069; H04L 41/0803; H04L 41/0813; H04L 41/20; H04L 41/5003; H04L 41/5009; H04L 41/5022; H04L 41/5025; H04L 41/5051; H04L 43/06; H04L 43/08; H04L 43/0805; H04L 43/0811; H04L 43/0817; H04L 43/0876; H04L 43/12; H04L 45/00; H04L 45/14; H04L 45/58; H04L 45/586; H04L 45/66; H04L 45/7457; H04L 47/00; H04L 47/10; H04L 47/11; H04L 47/125; H04L 49/15; H04L 61/20; H04L 63/02; H04L 63/0227; H04L 63/0272; H04L 63/0823; H04L 63/10; H04L 63/104; H04L 63/107; H04L 63/1408; H04L 63/1441; H04L 63/145; H04L 67/00; H04L 67/10; H04L 67/1006; H04L 67/16; H04L 67/327; H04L 67/34; H04L 69/40
See application file for complete search history.

(56) References Cited

U.S. PATENT DOCUMENTS

| | | |
|---|---|---|
| 6,259,705 B1 | 7/2001 | Takahashi |
| 6,601,084 B1 | 7/2003 | Bhaskaran et al. |
| 6,643,260 B1 | 11/2003 | Kloth et al. |
| 6,683,873 B1 | 1/2004 | Kwok et al. |
| 6,721,800 B1 | 4/2004 | Basso et al. |
| 6,735,631 B1 | 5/2004 | Oehrke et al. |
| 6,779,039 B1 | 8/2004 | Bommareddy et al. |
| 6,996,615 B1 | 2/2006 | McGuire |
| 7,062,571 B1 | 6/2006 | Dale et al. |
| 7,284,053 B1 | 10/2007 | O'Rourke et al. |
| 7,313,667 B1 | 12/2007 | Pullela et al. |
| 7,328,237 B1 | 2/2008 | Thubert et al. |
| 7,536,476 B1 | 5/2009 | Alleyne |
| 7,542,423 B1 | 6/2009 | Morishige et al. |
| 7,567,504 B2 | 7/2009 | Darling et al. |
| 7,623,455 B2 | 11/2009 | Hilla et al. |
| 7,808,897 B1 | 10/2010 | Mehta et al. |
| 7,852,774 B2 | 12/2010 | Shen et al. |
| 8,014,278 B1 | 9/2011 | Subramanian et al. |
| 8,259,722 B1 | 9/2012 | Kharitonov |
| 8,284,664 B1 | 10/2012 | Aybay et al. |
| 8,301,645 B1 | 10/2012 | Crook |
| 8,467,294 B2 | 6/2013 | Raman et al. |
| 8,510,469 B2 | 8/2013 | Portolani |
| 8,553,552 B2 | 10/2013 | Hu et al. |
| 8,611,356 B2 | 12/2013 | Yu et al. |
| 8,868,726 B1 | 10/2014 | Tu et al. |
| 8,937,942 B1 | 1/2015 | Li et al. |
| 9,178,807 B1 | 11/2015 | Chua et al. |
| 9,246,998 B2 | 1/2016 | Kumar et al. |
| 9,258,243 B2 | 2/2016 | Guichard et al. |
| 9,397,946 B1 | 7/2016 | Yadav |
| 9,432,294 B1 | 8/2016 | Sharma et al. |
| 9,444,744 B1 | 9/2016 | Sharma et al. |
| 9,565,135 B2 | 2/2017 | Li et al. |
| 9,755,959 B2 | 9/2017 | Guichard et al. |
| 9,825,865 B1 | 11/2017 | Sharma et al. |
| 9,853,898 B1 | 12/2017 | Subramanian et al. |
| 10,108,791 B1 | 10/2018 | Masterman |
| 2002/0184368 A1 | 12/2002 | Wang |
| 2003/0056001 A1 | 3/2003 | Mate et al. |
| 2003/0097405 A1 | 5/2003 | Laux et al. |
| 2004/0004941 A1 | 1/2004 | Malan et al. |
| 2004/0258062 A1 | 12/2004 | Narvaez |
| 2004/0264481 A1 | 12/2004 | Darling et al. |
| 2004/0267920 A1 | 12/2004 | Hydrie et al. |
| 2005/0027858 A1 | 2/2005 | Sloth et al. |
| 2005/0125424 A1 | 6/2005 | Herriott et al. |
| 2005/0207420 A1 | 9/2005 | Shanklin et al. |
| 2005/0249199 A1 | 11/2005 | Albert et al. |
| 2005/0281205 A1 | 12/2005 | Chandwadkar et al. |
| 2005/0281257 A1 | 12/2005 | Yazaki et al. |
| 2006/0098573 A1 | 5/2006 | Beer et al. |
| 2006/0104286 A1 | 5/2006 | Cheriton |
| 2006/0133371 A1 | 6/2006 | Matoba |
| 2006/0155875 A1 | 7/2006 | Cheriton |
| 2006/0227705 A1 | 10/2006 | Chandwadkar et al. |
| 2007/0016670 A1* | 1/2007 | Cooper .................. H04L 43/12 709/224 |
| 2007/0165622 A1 | 7/2007 | O'Rourke et al. |
| 2008/0084880 A1 | 4/2008 | Dharwadkar |
| 2009/0135722 A1 | 5/2009 | Boers et al. |
| 2009/0198724 A1 | 8/2009 | Valimaki et al. |
| 2009/0304007 A1 | 12/2009 | Tanaka et al. |
| 2010/0251128 A1 | 9/2010 | Cordasco |
| 2011/0055470 A1 | 3/2011 | Portolani |
| 2011/0110382 A1 | 5/2011 | Jabr et al. |
| 2011/0116443 A1 | 5/2011 | Yu et al. |
| 2011/0235508 A1 | 9/2011 | Goel et al. |
| 2011/0261811 A1 | 10/2011 | Battestilli et al. |
| 2011/0283013 A1 | 11/2011 | Grosser et al. |
| 2012/0163164 A1 | 6/2012 | Terry et al. |
| 2012/0163180 A1 | 6/2012 | Goel |
| 2012/0188891 A1 | 7/2012 | Vaelimaa et al. |
| 2012/0201135 A1 | 8/2012 | Ding et al. |
| 2012/0246637 A1 | 9/2012 | Kreeger et al. |
| 2012/0303809 A1 | 11/2012 | Patel et al. |
| 2012/0317276 A1 | 12/2012 | Muniraju |
| 2013/0044636 A1 | 2/2013 | Koponen et al. |
| 2013/0201989 A1 | 8/2013 | Hu et al. |
| 2013/0235868 A1 | 9/2013 | Owens et al. |
| 2013/0272305 A1 | 10/2013 | Lefebvre et al. |
| 2013/0298243 A1 | 11/2013 | Kumar et al. |
| 2013/0343408 A1 | 12/2013 | Cook et al. |
| 2014/0006535 A1 | 1/2014 | Reddy |
| 2014/0019602 A1 | 1/2014 | Murthy et al. |
| 2014/0025986 A1 | 1/2014 | Kalyanaraman et al. |
| 2014/0075108 A1 | 3/2014 | Dong et al. |
| 2014/0233564 A1 | 8/2014 | Lue et al. |
| 2014/0282611 A1 | 9/2014 | Campbell et al. |
| 2014/0307553 A1 | 10/2014 | Fung |
| 2014/0307580 A1 | 10/2014 | Fung |

(56) References Cited

U.S. PATENT DOCUMENTS

| | | |
|---|---|---|
| 2014/0321462 A1 | 10/2014 | Kancherla et al. |
| 2014/0341029 A1 | 11/2014 | Allan et al. |
| 2014/0372567 A1 | 12/2014 | Ganesh et al. |
| 2015/0081762 A1 | 3/2015 | Mason et al. |
| 2015/0085870 A1 | 3/2015 | Narasimha et al. |
| 2015/0117458 A1 | 4/2015 | Gurkan et al. |
| 2015/0124815 A1 | 5/2015 | Beliveau et al. |
| 2015/0207741 A1 | 7/2015 | Luo et al. |
| 2015/0215819 A1 | 7/2015 | Bosch et al. |
| 2015/0355946 A1 | 12/2015 | Kang |
| 2015/0381560 A1* | 12/2015 | Chippa ............... H04L 67/1095 709/226 |
| 2016/0087887 A1 | 3/2016 | Fung |
| 2016/0094643 A1 | 3/2016 | Jain et al. |
| 2016/0182378 A1 | 6/2016 | Basavaraja et al. |
| 2016/0182379 A1 | 6/2016 | Mehra et al. |
| 2016/0212048 A1 | 7/2016 | Kaempfer et al. |
| 2016/0218918 A1 | 7/2016 | Chu et al. |
| 2016/0241436 A1 | 8/2016 | Fourie et al. |
| 2016/0241491 A1* | 8/2016 | Tripathi .............. H04L 49/1523 |
| 2016/0251607 A1 | 9/2016 | Kloos |
| 2016/0261497 A1 | 9/2016 | Arisoylu et al. |
| 2016/0269295 A1 | 9/2016 | A S et al. |
| 2016/0283290 A1 | 9/2016 | Porat |
| 2016/0315814 A1 | 10/2016 | Thirumurthi et al. |
| 2016/0316005 A1 | 10/2016 | Thirumurthi et al. |
| 2016/0328159 A1 | 11/2016 | Coddington et al. |
| 2016/0337244 A1 | 11/2016 | Baveja et al. |
| 2017/0031704 A1* | 2/2017 | Sudhakaran .......... G06F 16/128 |
| 2017/0093670 A1 | 3/2017 | Dinan et al. |
| 2017/0118069 A1 | 4/2017 | Sharma et al. |
| 2017/0118088 A1 | 4/2017 | Koizumi |
| 2017/0118116 A1 | 4/2017 | Baveja et al. |
| 2017/0149632 A1 | 5/2017 | Saltsidis et al. |
| 2017/0171343 A1* | 6/2017 | Venkataramanan ........................ H04L 63/101 |
| 2017/0214719 A1* | 7/2017 | Mohan .................. H04L 63/101 |
| 2018/0091420 A1 | 3/2018 | Drake et al. |

OTHER PUBLICATIONS

"Cisco Nexus 7000 Series Switches Command Reference: The Catena Solution", Feb. 14, 2017, 48 pages.

"Cisco Nexus 7000 Series Switches Configuration Guide: The Catena Solution", Dec. 21, 2016, 28 pages.

Zhang, et al., "L4-L7 Service Function Chaining Solution Architecture", Open Networking Foundation, Version 1.0, ONF TS-027, Open Flow, Jun. 14, 2015, 36 pgs.

Kumbhare, et al., "Opendaylight Service Function Chaining Use-Cases", Ericsson, OpenDaylight SFC Use Cases, Oct. 14, 2014, 25 pgs.

Su, et al., "An OpenFlow-based Dynamic Service Chaining Approach for Hybrid Network Functions Virtualization", Proceedings of the 4th IIAE International Conference on Industrial Application Engineering 2016, DOI: 10.12792/iciac2016.019, the Institute of Industrial Applications Engineers, Japan, Mar. 26-30, 2016, 6 pgs.

Blendin, et al., "Position Paper: Software-Defined Network Service Chaining", European Workshop on Software Defined Networks, Sep. 2014, 6 pgs.

Karadeniz, et al., "Hardware Design and Implementation of a Network-on-Chip Based Load Balancing Switch Fabric," IEEE, 2012 International Conference on Reconfigurable Computing and FPGAs, Dec. 2012, 7 pages.

Wang, et al., "Load-Balancing Behind Switch Fabrics," EE Times, designlines, Wireless & Networking, Design How-To, Sep. 25, 2001, 5 pages.

Parissis, Booking.com, "Distributed Load Balancing, Real Case Example Using Open Source on Commodity Hardware," LinuxConf Berlin, Oct. 2016, 20 pages.

\* cited by examiner

HYBRID SERVICES INSERTION

PRIORITY CLAIM

This application claims priority to U.S. Provisional Application No. 62/568,017, filed Oct. 4, 2017, entitled HYBRID SERVICES INSERTION, and to Indian Provisional Application No. 201741035135, filed Oct. 4, 2017, entitled MULTI-MODE APPLICATION SERVICE CHAIN, the entirety of each of said applications is incorporated herein by reference.

TECHNICAL FIELD

This disclosure relates in general to the field of communications and, more particularly, to service chaining without any additional packet headers.

BACKGROUND

End users have more communications choices than ever before. A number of prominent technological trends are currently afoot (e.g., more computing devices, more online video services, more Internet video traffic), and these trends are changing the network delivery landscape. One of these trends is service chaining. Service chaining is an emerging set of technologies and processes that enable operators to configure network services dynamically in software without having to make changes to the network at the hardware level.

DESCRIPTION OF EXAMPLE EMBODIMENTS

Overview

Presented herein are service chaining techniques for selective traffic redirection based on Access Control List (ACL) configurations on switches. A switch may redirect network traffic to one or more applications configured to perform a network service function. The applications may be specified in the service chain using different modes in a multi-mode configuration. The switch and one or more applications may be independently configured in L2 or L3 mode. In one embodiment, a method involves storing, in at least one hardware module of a network device having a plurality of ports, attributes for at least one access control list and associated actions that cause network packets received at one of the plurality of ports that match the attributes for the at least one access control list, to be directed into a service chain that includes at least a first network processing application specified according to a port and a second network processing application specified according to an internet protocol (IP) address. The method also involves directing a received network packet that matches the attributes for the at least one access control list into the service chain.

Example Embodiments

Presented herein are techniques for service chaining without any additional packet headers. This allows for health monitoring and automatic failure handling and transparent insertion of appliances (configurations not required) with wire-speed performance. These techniques may be implemented on existing Application Specific Integrated Circuits (ASICs) and linecards in datacenter switches, and allow for selective traffic redirection based on ACL configuration. For example, if traffic matches an entry in an ACL, that traffic may be forwarded as indicated in the ACL, e.g., to an application configured to provide one or more network services. As provided herein, redirecting traffic based on ACL configuration also permits specifying applications using different modes in a service chain. As provided herein, redirecting traffic based on ACL configuration also permits hybrid services insertion, where a switch is configured in one mode (e.g., Layer 2 (L2)) and an application providing a service is configured in another mode (e.g., Layer 3 (L3)).

Figure 1:
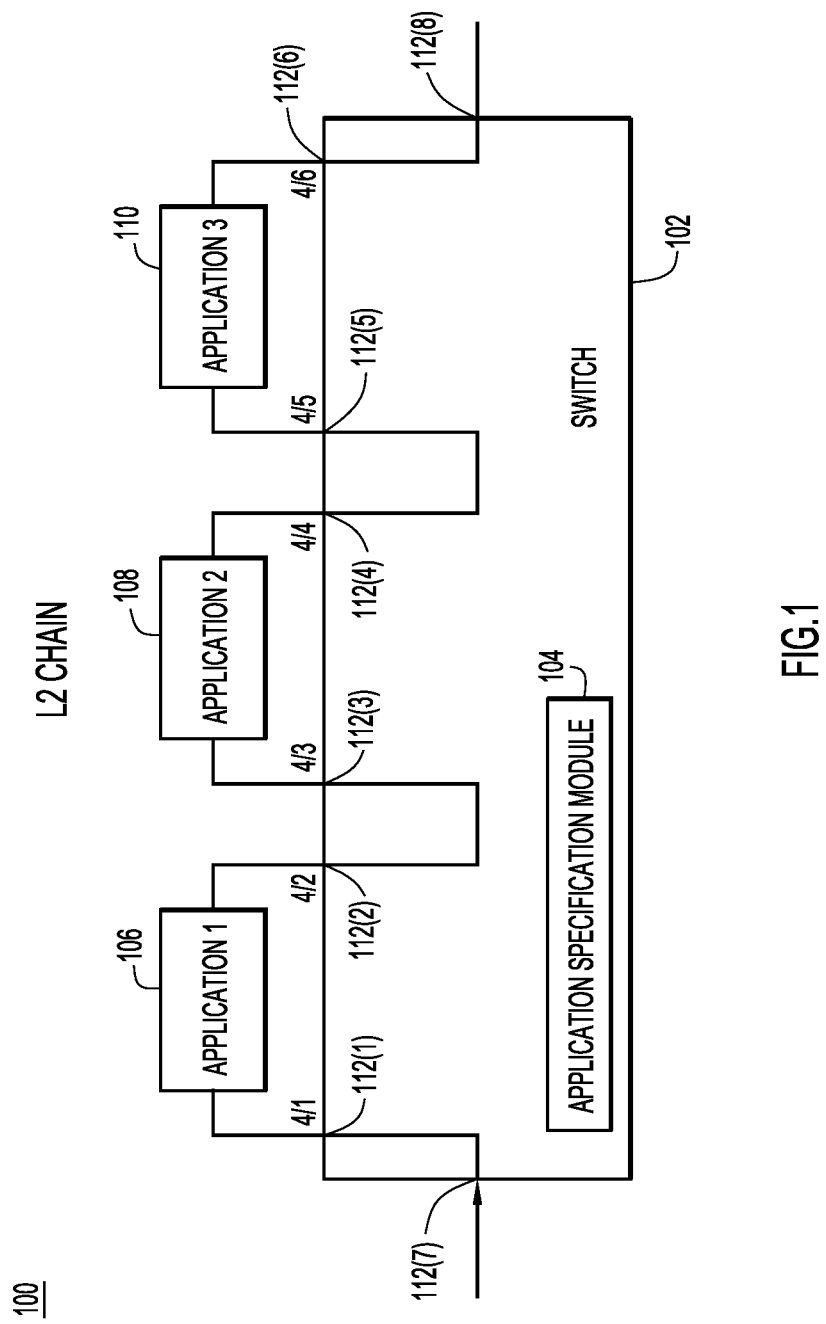
FIG. 1 is a block diagram of a network environment in which a switch is configured to specify applications in a service chain using a Layer 2 (L2) mode, according to an example embodiment.

FIG. 1 illustrates an example network environment 100 in which a switch is configured to specify applications in a service chain using a Layer 2 (L2) mode, according to an example embodiment. The network environment 100 includes a switch 102, which includes an application specification module 104, and three applications (Application 1 identified by reference numeral 106, Application 2 identified by reference numeral 108, and Application 3 identified by reference numeral 110). Each application may be configured to perform a network service function, and the switch 102 may be configured to forward network traffic to one or more of the applications as indicated in an ACL configured on the switch 102.

The path that each type of network traffic follows through the application(s) connected to the switch 102 is referred to as a service chain (or "chain"). FIG. 1 illustrates a chain that includes all three applications. In this example, the applications 106, 108 and 110 are specified using a L2 mode. This is enabled by the application specification module 104 of the switch 102.

An L2 chain has elements that are specified in a set of port groups (e.g., a list of interfaces). An example port group is:

port-group pg 11
   interface eth 2/1
   interface eth 2/2
   interface eth 3/1
   interface eth 3/2

In the example of FIG. 1, there are three port groups, each containing one application. Application 1 is specified by eth 4/1 112(1) (egress from switch 102) and eth 4/2 112(2) (ingress to switch 102); application 2 is specified by eth 4/3 112(3) (egress from switch 102) and eth 4/4 112(4) (ingress to switch 102); and application 3 is specified by eth 4/5 112(5) (egress from switch 102) and eth 4/6 112(6) (ingress to switch 102). In the example of FIG. 1, each of eth 4/1, eth 4/2, eth 4/3, eth 4/5, and eth 4/6 is a L2 interface, and more specifically an Ethernet interface. The switch 102 also include interfaces 112(7) and 112(8), which also may be L2 interfaces, e.g., Ethernet interfaces.

L2 mode may also be referred to as "transparent mode" or "bump in the wire mode" because no information in the packet (Media Access Control (MAC) address, Internet Protocol (IP) address, etc.) is rewritten.

Figure 2:
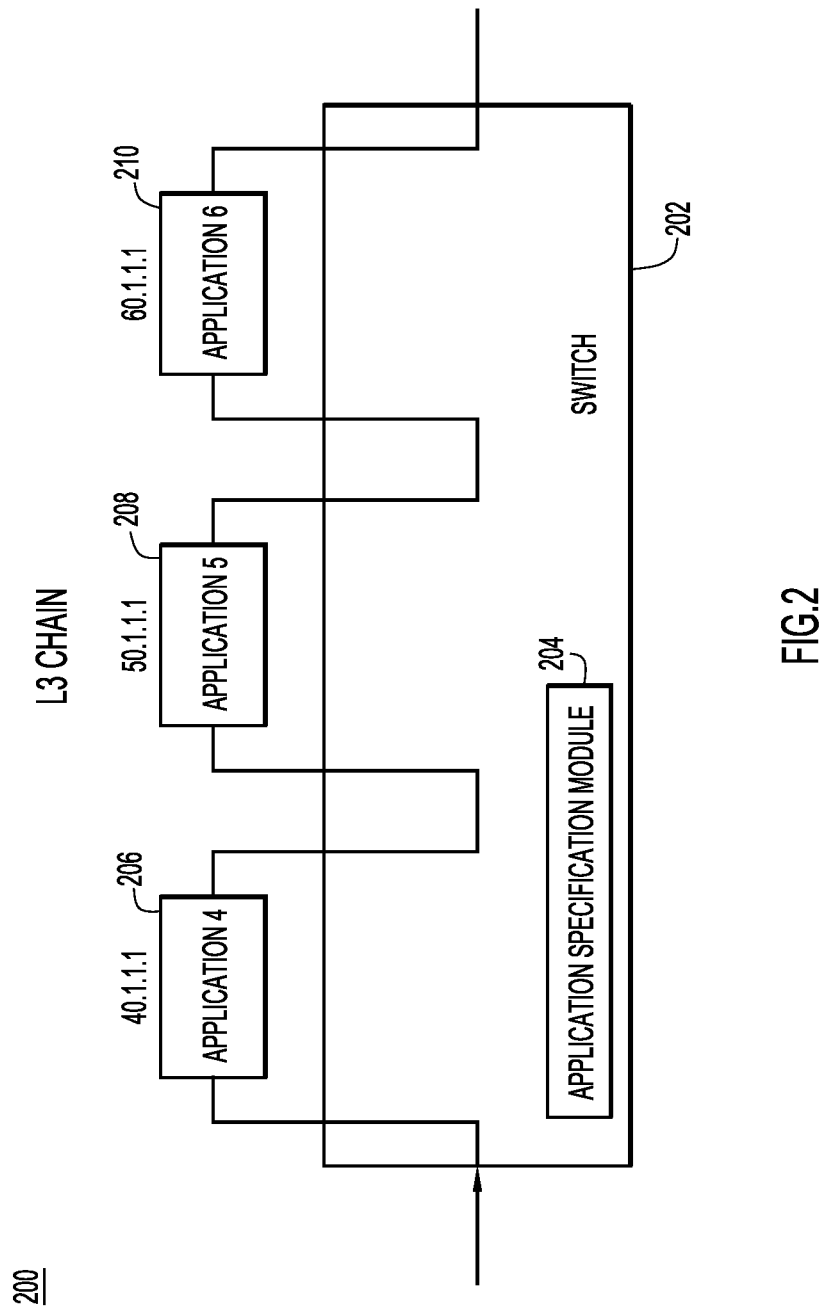
FIG. 2 is a block diagram of a network environment in which a switch is configured to specify applications in a service chain using a Layer 3 (L3) mode, according to an example embodiment.

FIG. 2 illustrates an example network environment 200 configured to specify applications in a service chain using a Layer 3 (L3) mode, according to an example embodiment. The network environment 200 includes a switch 202, which includes an application specification module 204, and three applications (Application 4 identified by reference numeral 206, Application 5 identified by reference numeral 208, and Application 6 identified by reference numeral 210). FIG. 2 illustrates a chain that includes all three applications. In this example, the applications 206, 208 and 210 are specified using L3 mode. This is enabled by the application specification module 204 of the switch 202.

An L3 chain has elements that are specified in a set of device groups. An example device group is:

device-group dg 11
   node ip 10.1.1.1
   node ip 10.1.1.2
   . . .
   node ip 10.1.1.8

In the example of FIG. 2, there are three device groups, each containing one application. Application 4 is specified by IP address 40.1.1.1; application 5 is specified by IP address 50.1.1.1; and application 6 is specified by IP address 60.1.1.1.

L3 mode may also be referred to as "routed mode" because the MAC address in the packet is rewritten.

As described herein, both modes (L2 and L3) may coexist in the same service chain. This is referred to herein as a "multi-mode" configuration, in which at least one application in the service chain runs in L2 mode, and at least one application in the service chain runs in L3 mode.

Figure 3:
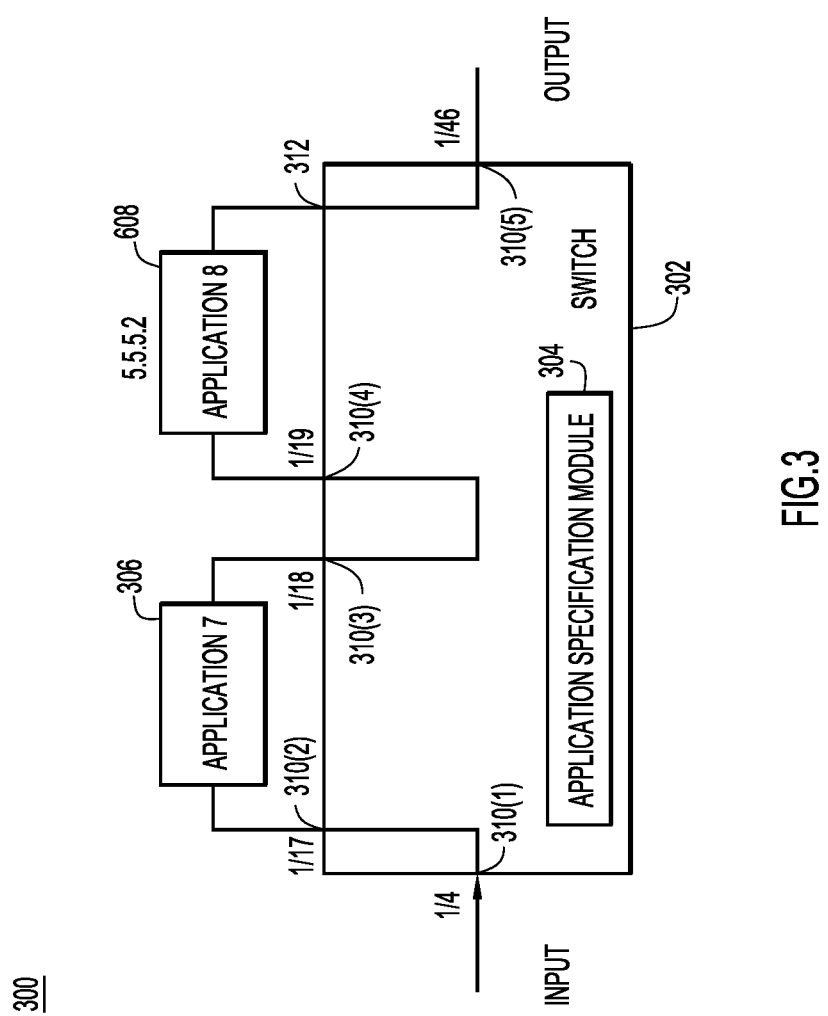
FIG. 3 is a block diagram of a network environment in which a switch is configured to specify applications in a service chain using L2 and L3 modes, according to an example embodiment.

FIG. 3 is a block diagram of a network environment in which a switch is configured to specify applications in a service chain using L2 and L3 modes, according to an example embodiment. In other words, FIG. 3 illustrates an example multi-mode configuration. The network environment 300 includes a switch 302, which includes an application specification module 304, and two applications (Application 7 identified by reference numeral 306 and Application 8 identified by reference numeral 308). The switch 302 includes a number of interfaces or ports. The switch 302 includes interfaces eth 1/4 310(1), eth 1/17 310(2), eth 1/18 310(3), eth 1/19 310(4), and eth 1/45 310(5). The switch 302 may also include interface 312. FIG. 3 illustrates a chain that includes both applications. In this example, Application 7 is specified using L2 mode, and Application 8 is specified using L3 mode. More specifically, Application 7 is specified by eth 1/17 310(2) (egress from switch 302) and eth 1/18 310(3) (ingress to switch 302), and Application 8 is specified by IP address 5.5.5.2. This is enabled by the application specification module 304.

Example Command Line Interface (CLI) commands for the multi-mode configuration of FIG. 3 are listed below:

```
Nexus9k-79(config-catena)# show run catena
!Command: show running-config catena
!Time: Tue Sep 5 08:06:22 2017
version 7.0(3)I7(1)
feature catena
catena device-group DG1
   node ip 5.5.5.2
catena port-acl Forward
   10 deny ip 192.168.10.0 255.255.255.0 192.168.20.0 255.255.255.0
   20 permit ip 10.10.10.0/24 10.10.20.0/24
catena port-acl reverse
   10 deny ip 192.168.20.0 255.255.255.0 192.168. 10.0 255.255.255.0
   20 permit ip 10.10.20.0/24 10.10.10.0/24
catena port-group L2-pg1
   interface Eth1/4
catena port-group L2-pg2
   interface Eth1/17
catena port-group L3-pg1
   interface Eth1/18
catena port-group L3-pg2
   interface Eth1/46
catena port-group L2-pg3
   interface Eth1/19
catena Instance_L2&L3_Forward
   chain 10
      10 access-list Forward ingress-port-group L2-pg1 egress-port-
          group L2-pg2 mode forward
      20 access-list PBR_Forward ingress-port-group L3-pg1 egress-
          device-group DG1 mode forward
   no shutdown
catena Instance_L2&L3_Reverse
   chain 10
      10 access-list PBR_reverse ingress-port-group L3-pg2 egress-
          device-group DG1 mode forward
      20 access-list reverse ingress-port-group L2-pg3 egress-port-
          group L3-pg1 mode forward
   no shutdown
```

In this example, the network traffic proceeds along in the service chain in the forward (not the reverse) direction. As specified in the CLI above, if the traffic matches "access-list Forward," and if the traffic arrives on ingress-port-group L2-pg1, the traffic is forwarded to egress-port-group L2-pg2. Here, ingress-port-group L2-pg1 includes eth 1/4, and egress-port-group L2-pg2 includes eth 1/17. Thus, as shown in FIG. 3, the traffic (which matches access-list Forward) arrives at eth 1/4 and is forwarded to Application 7 at eth 1/17 (e.g., in L2 mode).

As further specified in the CLI above, if the traffic matches "access-list PBR_Forward," and if the traffic arrives on ingress-port-group L3-pg1, the traffic is forwarded to egress-device-group DG1. Here, ingress-port-group L3-pg1 includes eth 1/18, and egress-device-group DG1 includes node ip 5.5.5.2. Thus, as shown in FIG. 3, the traffic (which matches access-list PBR_Forward) arrives at eth 1/18 and is forwarded to application 8 at IP address 5.5.5.2 (e.g., in L3 mode).

In the example of FIG. 3, Application 7 was specified using L2 mode, and Application 8 was specified using L3 mode.

A switch interface may be configured as L2 by the command—switch(config-if)# switchport.

An interface may be configured as L3 by the command—switch(config-if)# no switchport.

For chaining, a packet ingressing the switch on a switchport (e.g., an L2 interface) and that matches attributes for at least one access control list (on the switch) is applicable to be directed into a service chain that includes at least one network processing application specified according to a port (and/or port-group).

For chaining, a packet ingressing the switch on a "no switchport" (e.g., a L3 interface) and that matches attributes for at least one access control list (on the switch) is applicable to be directed into a service chain that includes at least one network processing application specified according to a device address, node address and/or IP-address (and/or device-group).

In addition to L2 and L3 modes, other modes may be used to specify applications in a multi-mode configuration. For example, Network Address Translation (NAT) mode and Generic Routing Encapsulation (GRE) mode may be included in a multi-mode service chain. NAT mode involves modifying both the MAC address and the IP address of a packet, and GRE mode involves using GRE encapsulation. In NAT mode, the switch rewrites one or more IP addresses, and in GRE mode, the switch adds (or removes) a GRE header.

Figure 4:
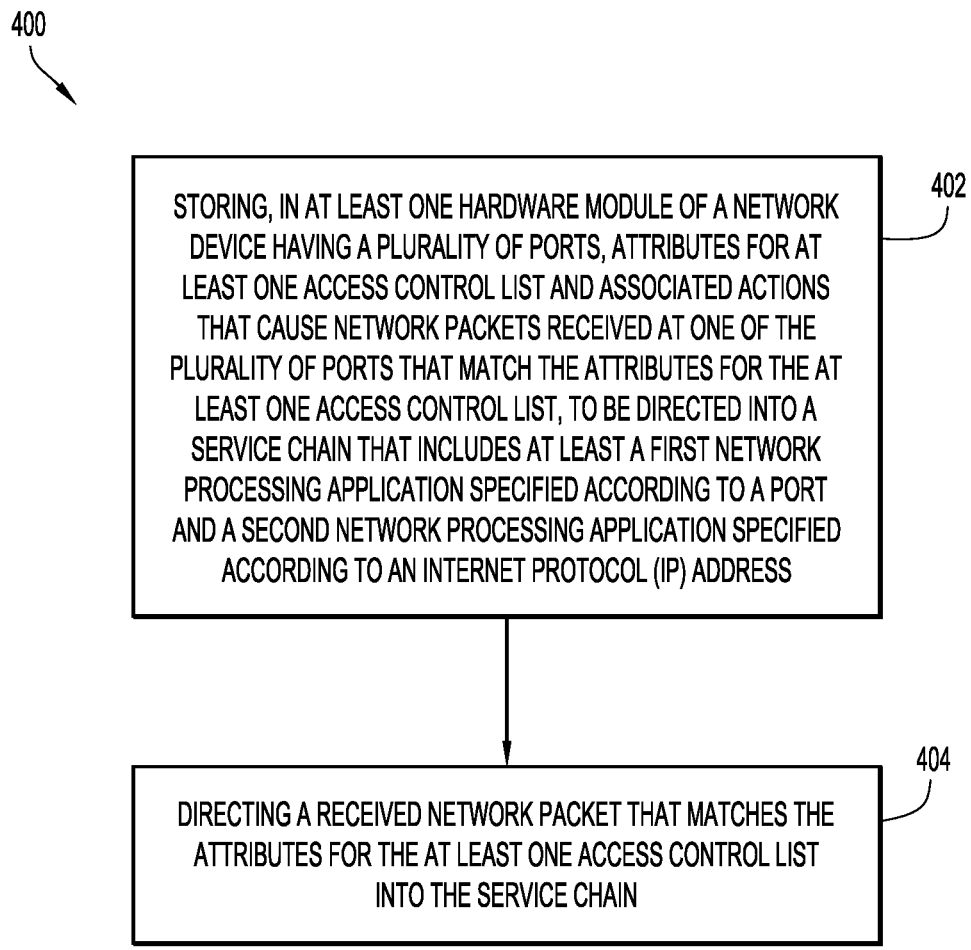
FIG. 4 is a flowchart of a method, according to an example embodiment.

FIG. 4 is a flow chart of an example method 400, according to an example embodiment. The method 400 includes, at 402, storing, in at least one hardware module of a network device having a plurality of ports, attributes for at least one access control list and associated actions that cause network packets received at one of the plurality of ports that match the attributes for the at least one access control list, to be directed into a service chain that includes at least a first network processing application specified according to a port and a second network processing application specified according to an internet protocol (IP) address. The method 400 also includes, at 404, directing a received network packet that matches the attributes for the at least one access control list into the service chain.

As set forth above, L2 mode may also be referred to as "transparent mode" or "bump in the wire mode" because no information in the packet (Media Access Control (MAC) address, Internet Protocol (IP) address, etc.) is rewritten. L3 mode may also be referred to as "routed mode" because the MAC address in the packet is rewritten.

At least four different types of services insertion are presented:

(1) Switch configured in L2 mode and application configured in L2 mode.

(2) Switch configured in L2 mode and application configured in L3 mode.

(3) Switch configured in L3 mode and application configured in L2 mode.

(4) Switch configured in L3 mode and application configured in L3 mode.

Figure 5:
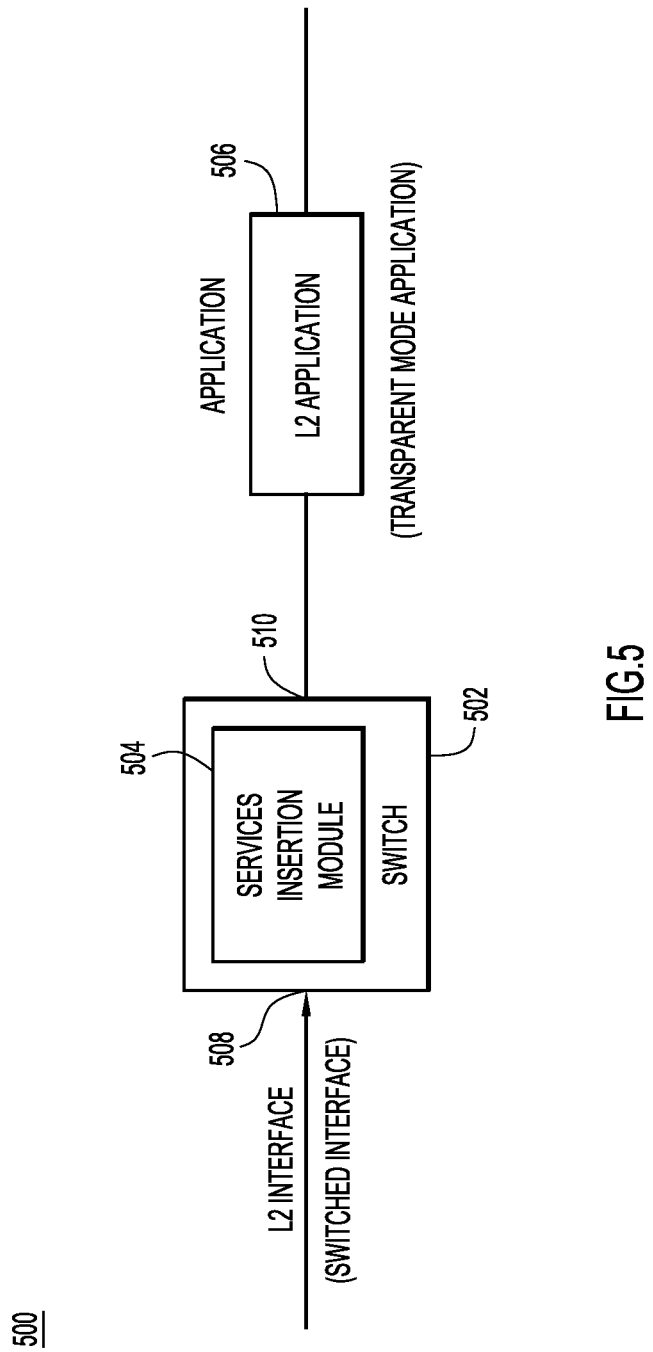
FIG. 5 is a block diagram of a network environment in which a switch in L2 mode is configured to forward network traffic to an application configured in L2 mode, according to an example embodiment.
Figure 6:
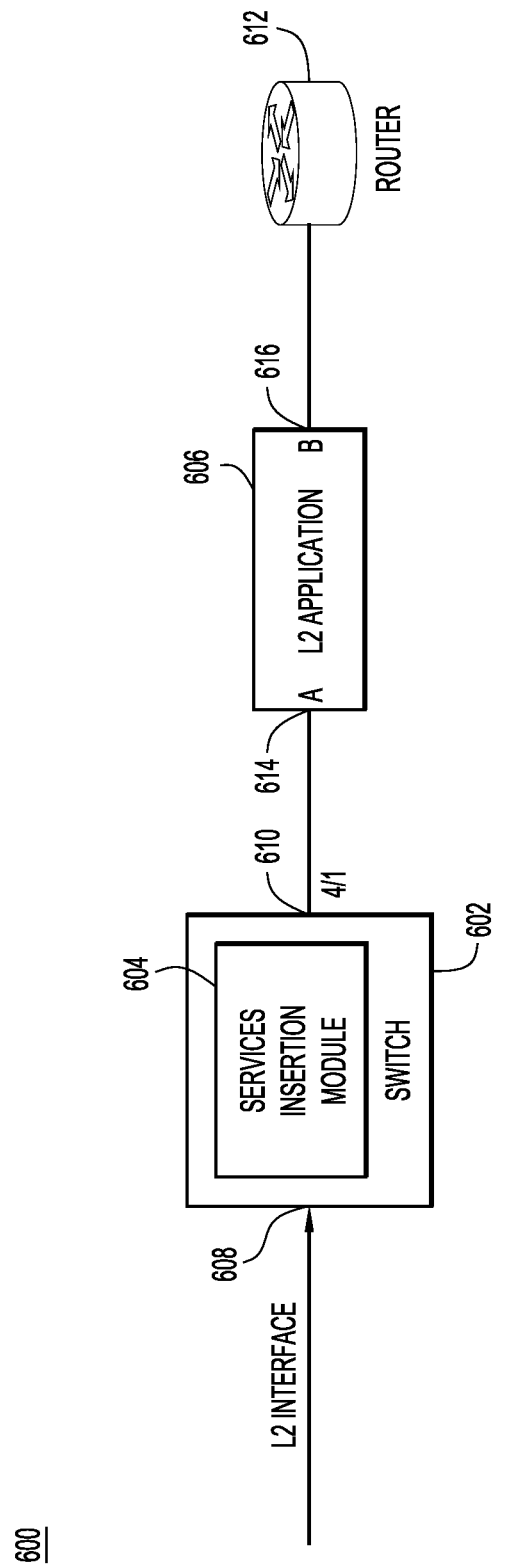
FIG. 6 a block diagram of another network environment in which a switch in L2 mode is configured to forward network traffic to an application configured in L2 mode, according to an example embodiment.
Figure 7:
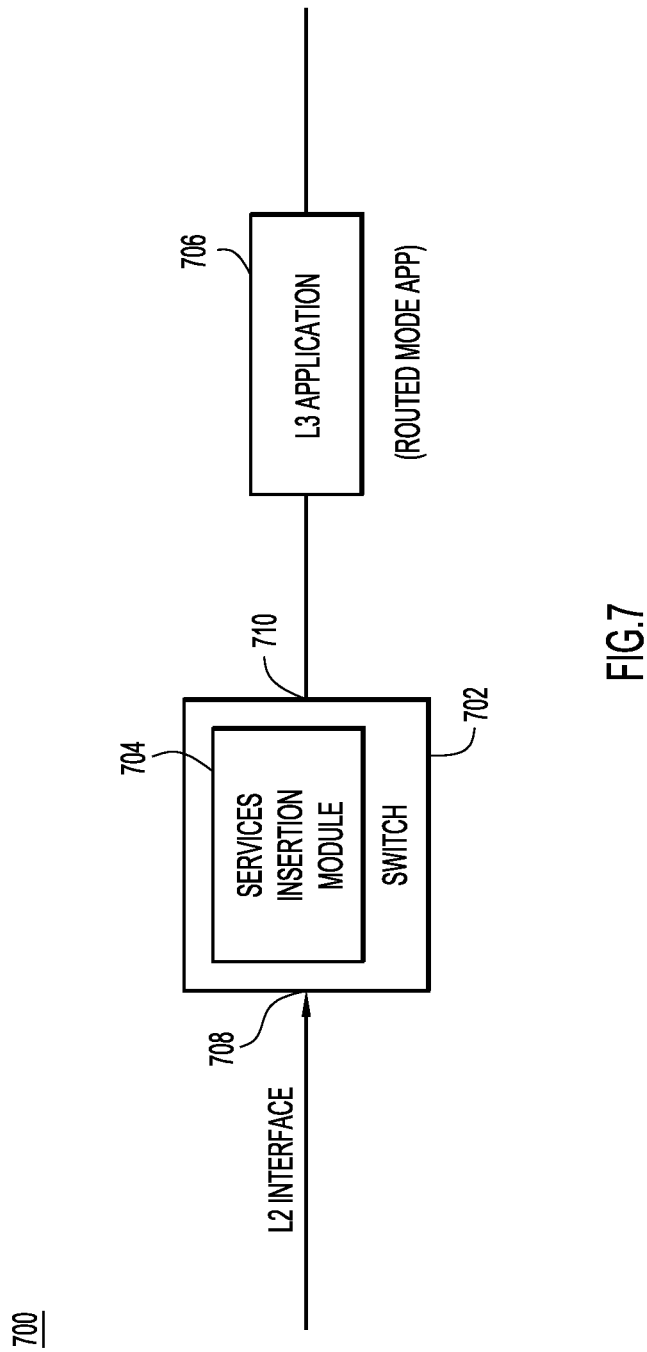
FIG. 7 is a block diagram of a network environment in which a switch in L2 mode is configured to forward network traffic to an application configured in L3 mode, according to an example embodiment.
Figure 8:
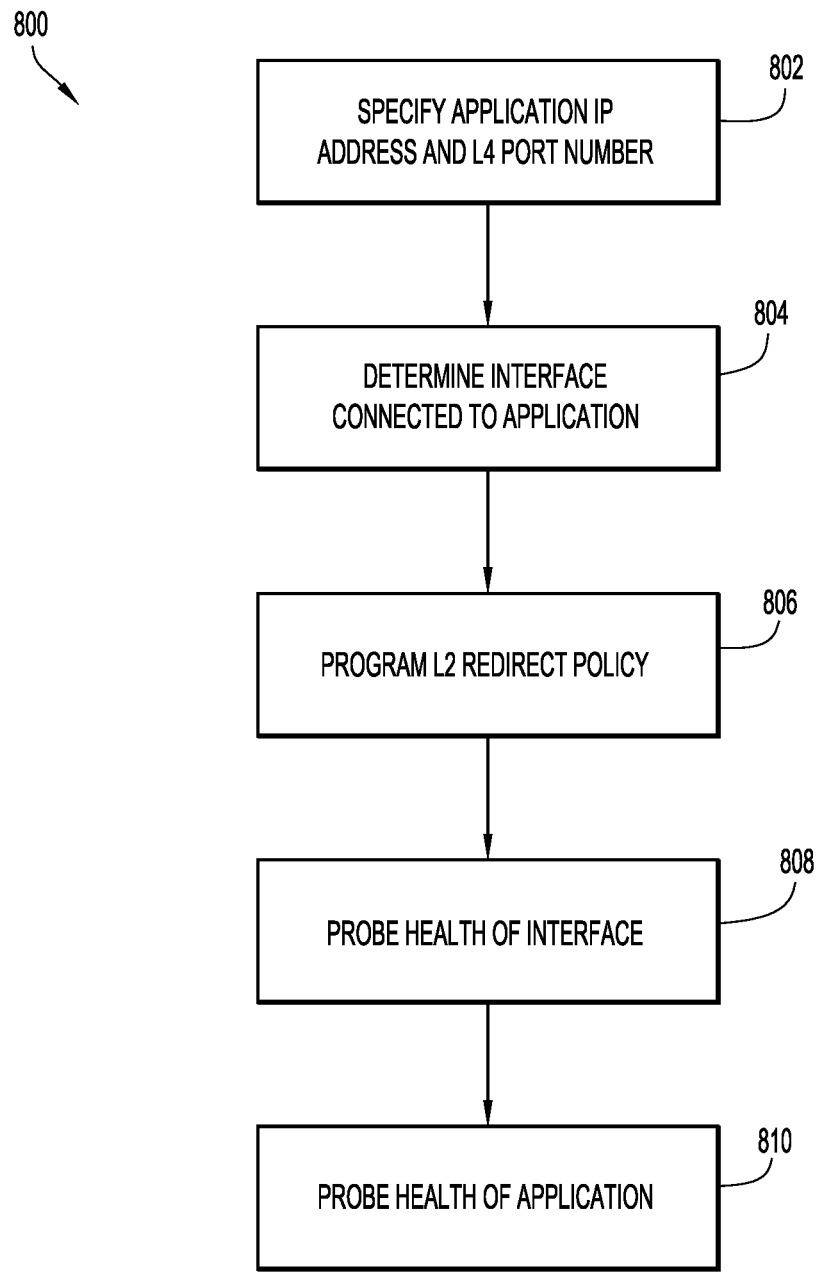
FIG. 8 is a flowchart of a method for the switch of FIG. 7 to monitor the health of the application and/or interface, according to an example embodiment.

FIGS. 5 and 6 illustrate examples for type (1) services insertion; FIGS. 7 and 8 illustrate examples for type (2) services insertion; FIGS. 9-12 illustrate examples for type (3) services insertion; and FIGS. 13-17 illustrate examples for type (4) services insertion. Types (2) and (3) relate to hybrid services insertion because the switch and application (service) are configured in different modes.

All four types of service insertion may employ application-native high-availability (HA) techniques for improved resilience. HA features enable availability monitoring between applications, connection state tracking, and synchronization of configurations. Both active/standby (e.g., as explained in more detail with reference to FIGS. 21 and 22) (e.g., using Generic Attribute Registration Protocol (GARP) in L3 mode) and active/active (e.g., using L2 EtherChannel or L3 IP-based load-balancing) techniques may be employed without changes to the logical packet flow presented herein. In one example, an application may provide Network Address Translation services in which the application may modify the IP header, or map public to private IP addresses. This may be performed in L2 or L3 modes of operation.

FIG. 5 illustrates an example network environment 500 in which a switch 502 in L2 mode, which includes a services insertion module 504, is configured to forward network traffic to an application 506 configured in L2 mode, according to an example embodiment. The switch 502 may include at least one L2 interface (or a switched interface) 508. Network packets may be received at the L2 interface 508 of the switch 502, or in other words, network packets may ingress the switch 502 at interface 508. The switch 502 may also include interface 510. The application 506 may be referred to as an L2 application or a transparent mode application. The application 506 may be configured to perform a network service function, and the switch 502 may be configured to forward network traffic to the application 506 as indicated in an ACL configured on the switch 502. FIG. 5 illustrates a chain that includes the application 506. The services insertion module 504 of the switch 502 enables the features described herein.

With regard to the data path, because both the switch 502 and the application 506 are configured in L2 mode, neither the switch 502 nor the application 506 modify any address in the packet header. With regard to the control path, the switch 502 may monitor the health of the link between the switch 502 and the application 506 to determine whether to continue forwarding traffic to the application 506.

Figure 20:
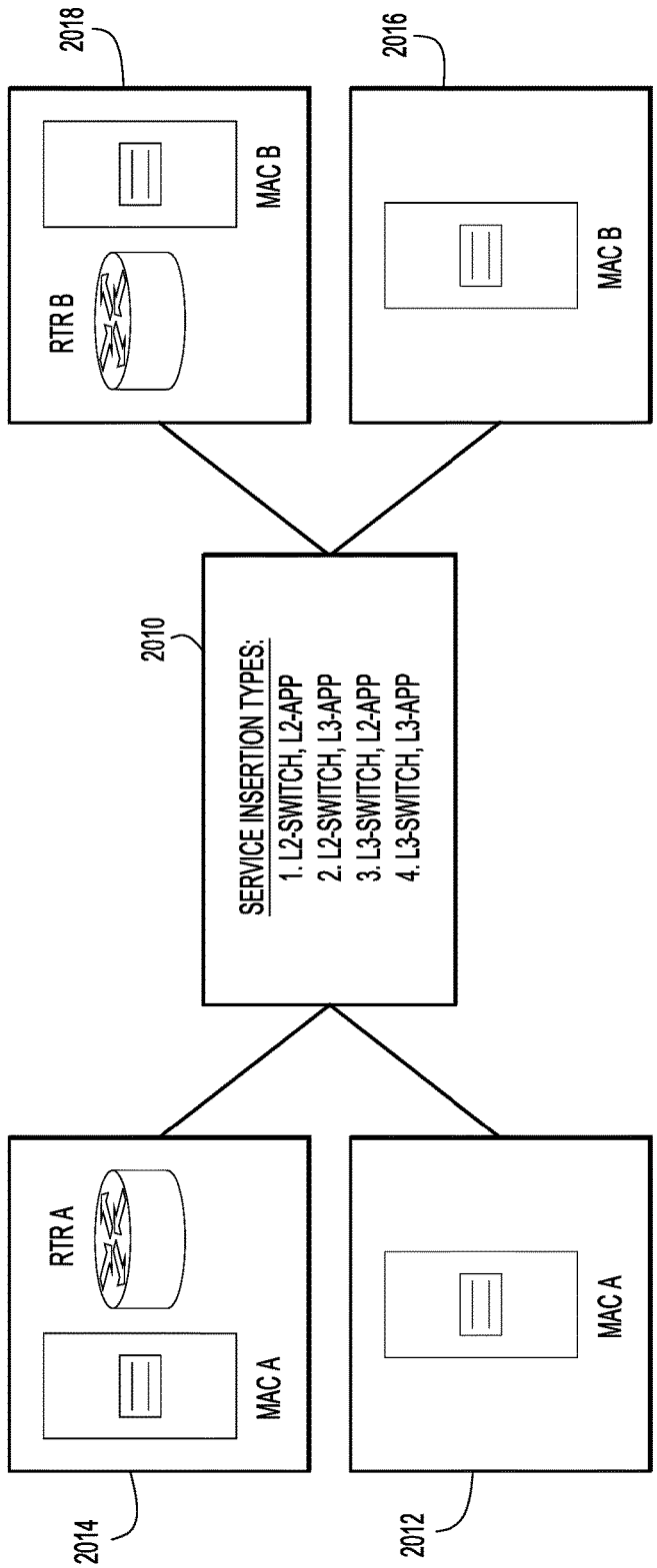
FIG. 20 illustrates various end host topologies before service insertion, according to an example embodiment.

FIG. 6 a block diagram of a network environment 600 in which a switch 602 in L2 mode, which includes a services insertion module 604, is configured to forward network traffic to an application 606 configured in L2 mode, according to an example embodiment. The switch 602 includes L2 interface 608 and eth 4/1 610. As shown in FIG. 6, the packet is destined for a router 612 (e.g., an L3 router). For example, this is before the packet may reach the final destination host connected behind the router. As such, the destination Media Access Control (MAC) address of the packet received by the switch 602 is set to the MAC address of the router 612. In this example, the switch 602 forwards the packet on eth 4/1 610 according to one or more ACLs. The L2 application 606 receives the packet on interface A 614, performs its service, and forwards the packet to interface B 616 without modifying the MAC address. The router 612 receives the packet and forwards the packet to the final destination IP address. As explained in more detail below, FIG. 20 illustrates how source and destination hosts may connect directly to the service insertion module or using a router. Routers may connect to multiple networks before arriving at their destination host.

FIG. 7 illustrates an example network environment 700 in which a switch 702 in L2 mode, which includes services insertion module 704, is configured to forward network traffic to an application 706 configured in L3 mode. The switch 702 includes the services insertion module 704 to enable the features described herein. With regard to the data path, because the switch 702 is configured in L2 mode, the switch 702 does not modify the MAC addresses of the packet. Because the application 706 is configured in L3 mode, the application 706 may rewrite the source and destination MAC addresses of the packet. The switch 702 includes L2 interface 708, and interface 710. The application 706 may be referred to as an L3 application or a routed mode application.

With regard to the control path, FIG. 8 is a flowchart of an example method 800 for the switch 702 of FIG. 7 to monitor the health of the application 706 and/or interface 710 based on the application IP address and Layer 4 (L4) port number. Initially, at 802, the application IP address and L4 port number may be specified. For example, the user may specify the application IP address and L4 port number. At 804, the switch 702 may determine the interface connecting the switch 702 to the application 706 (e.g., using the switch's Address Resolution Protocol (ARP) and/or adjacency tables). At 906, the switch 702 may program the L2 redirect policy (e.g., "if the network traffic matches $ACL_{11}$, redirect the traffic to the application interface"). At 808, the switch 702 may begin probing (e.g., monitoring) the health of the interface 710. At 810, the switch 702 may also/alternatively probe the health of the application 706 itself. The switch 702 may probe the health of the application 706 by sending an L4 probe packet to the application IP address and L4 port (e.g., sending packets to IP address 10.1.1.1 via Transmission Control Protocol (TCP) on port 80).

Figure 9:
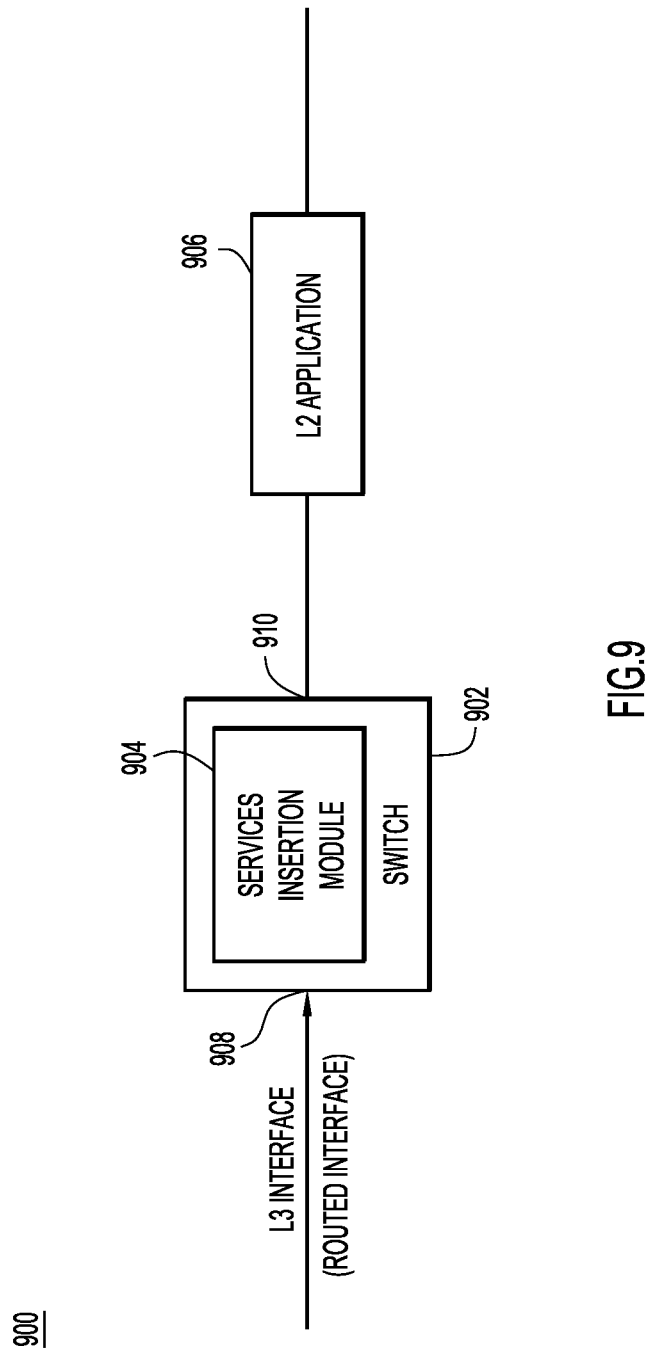
FIG. 9 is a block diagram of a network environment in which a switch in L3 mode is configured to forward network traffic to an application configured in L2 mode, according to an example embodiment.

FIG. 9 illustrates an example network environment 900 in which a switch 902 in L3 mode, which includes a services insertion module 904, is configured to forward network traffic to an application 906 configured in L2 mode. The switch 902 includes the services insertion module 904 to enable the features described herein. With regard to the data path, because the switch 902 is configured in L3 mode, the switch 902 may rewrite the destination and source MAC addresses of the packet. Because the application 906 is configured in L2 mode, the application 906 does not modify the packet header. With regard to the control path, the switch 902 may monitor the link state of the application 906. Optionally, the switch 902 may be provided with the application IP address and L4 port (of the application 906) to be monitored. The switch 902 may include at least one L3 interface (or routed interface). The switch 902 includes L3 interface 908, and interface 910.

Figure 10:
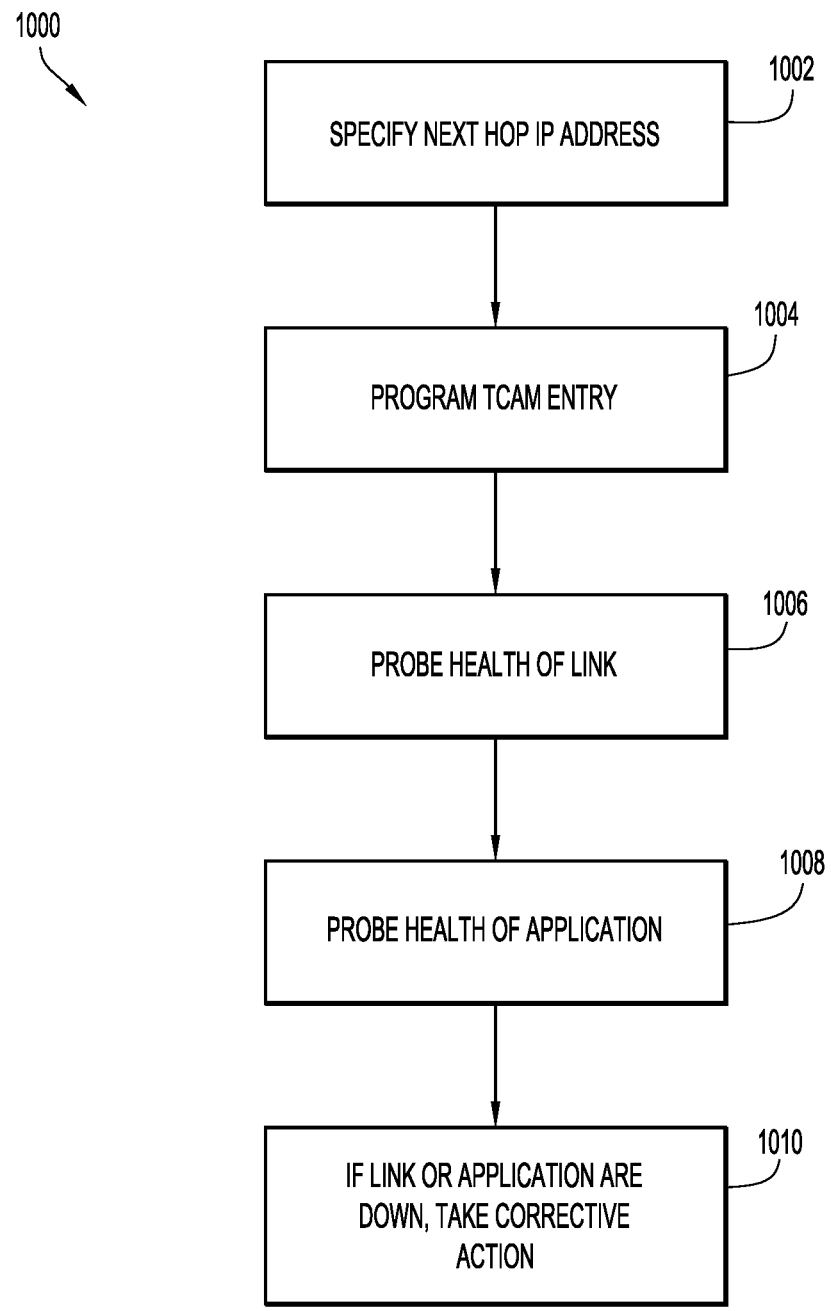
FIG. 10 is a flowchart of a method for the switch of FIG. 9 to monitor the health of the application and/or interface, according to an example embodiment.
Figure 11:
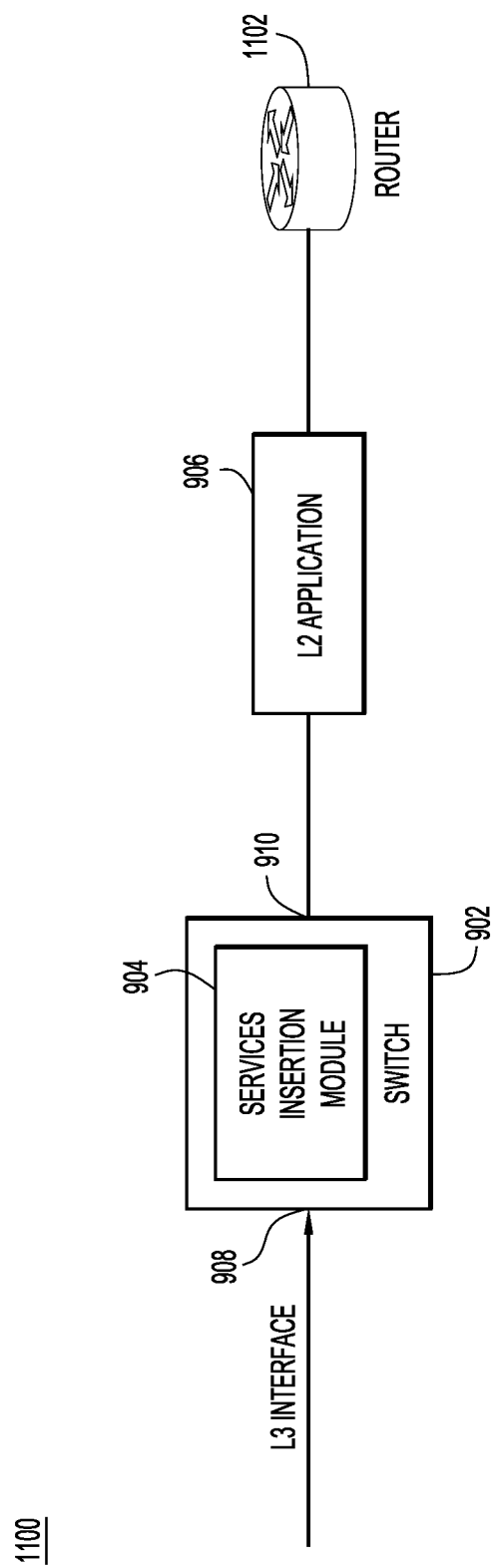
FIG. 11 is a block diagram of another network environment in which a switch in L3 mode is configured to forward network traffic to an application configured in L2 mode, according to an example embodiment.
Figure 12:
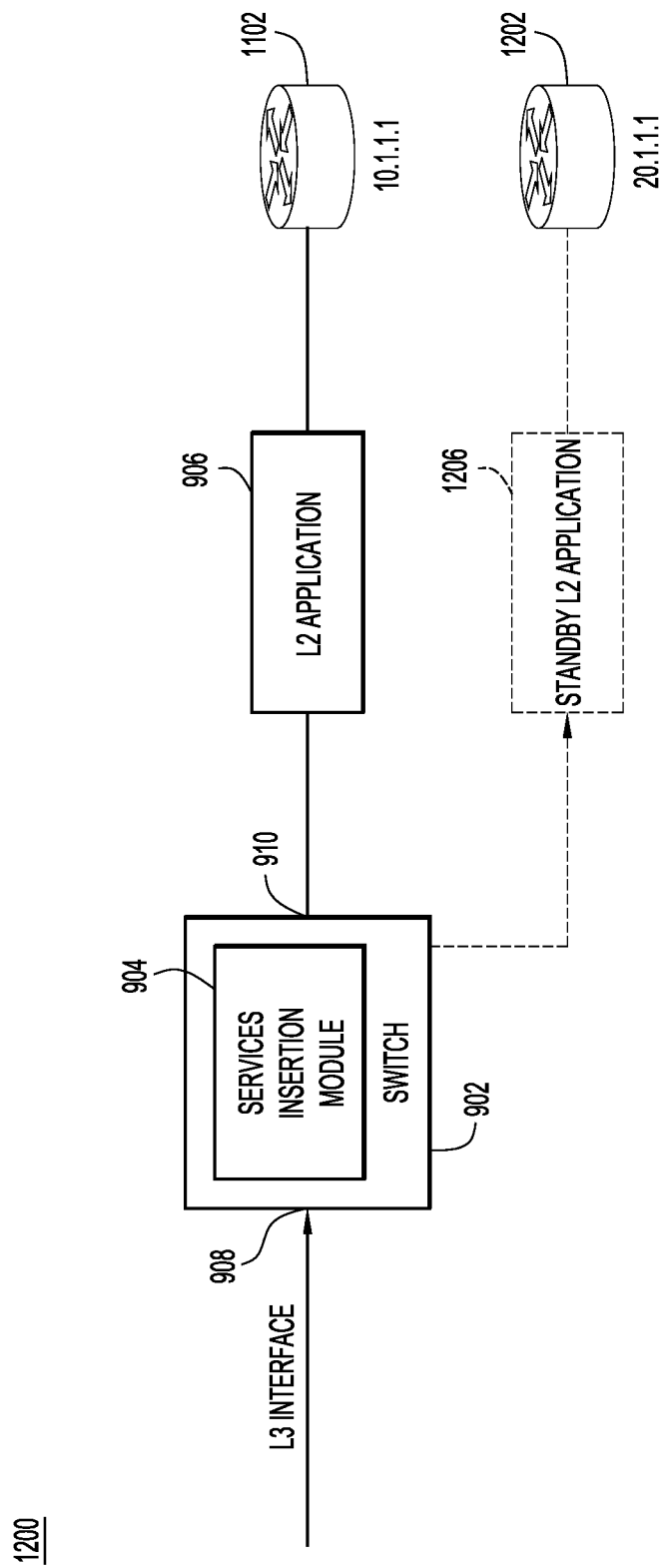
FIG. 12 is a block diagram of yet another network environment in which a switch in L3 mode is configured to forward network traffic to an application configured in L2 mode, according to an example embodiment.

FIG. 10 is a flowchart of an example method 1000 for the switch 902 of FIG. 9 to monitor the health of the application 906 and/or interface 910. Initially, at 1002, the next hop IP address may be specified. For example, the user may specify the next hop IP address. In the example of FIG. 11, the user may specify the IP address of the router (10.1.1.1) 1102 as the next hop IP address. At 1004, the switch 902 may program a Ternary Content-Addressable Memory (TCAM) entry (e.g., "if the network traffic matches a specified ACL, redirect the traffic to the next hop IP"). At 1006, the switch 902 may probe the health of the link, and at 1008 may optionally probe the health of the application 906. At 1010, if the L2 application 906 is down (and/or if the link is down), the switch 902 may take corrective action. For example, with reference to FIG. 12, the switch 902 may automatically redirect traffic to the IP address corresponding to a secondary (e.g., standby) application 1206. As shown, if the L2 application 906 (and/or the link) go down, the switch 902 may redirect traffic to the standby L2 application 1206 (e.g., by using IP address 20.1.1.1 instead of IP address 10.1.1.1). In this example, IP address 20.1.1.1 is the IP address of router 1202 and IP address 10.1.1.1 of the router 1102.

Figure 13:
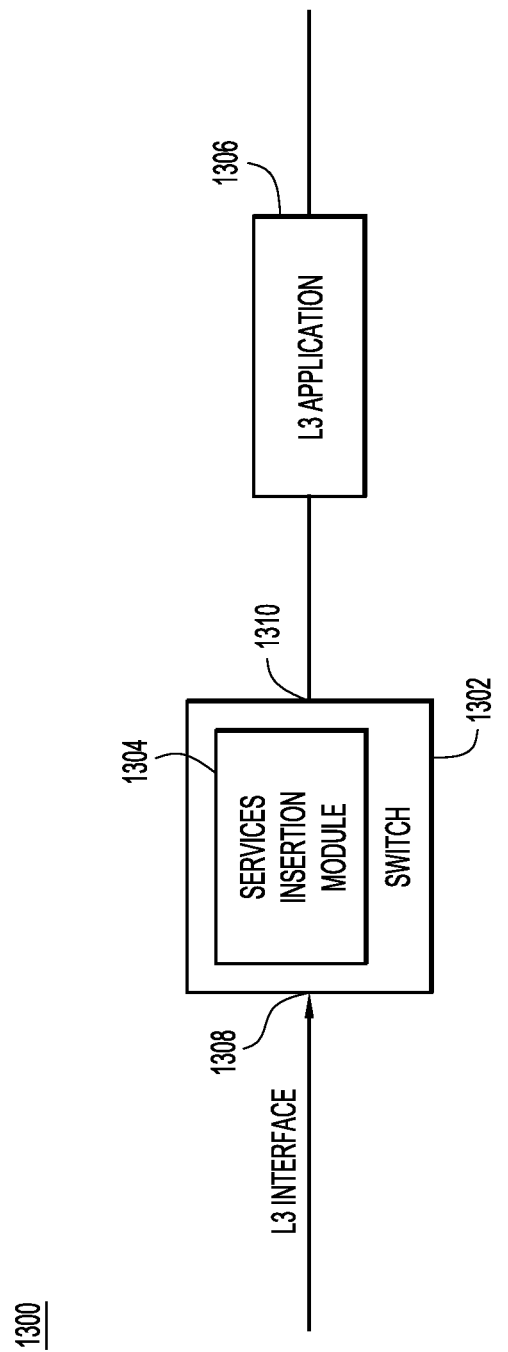
FIG. 13 is a block diagram of a network environment in which a switch in L3 mode is configured to forward network traffic to an application configured in L3 mode, according to an example embodiment.

FIG. 13 illustrates an example network environment 1300 in which a switch 1302 in L3 mode, which includes a services insertion module 1304, is configured to forward network traffic to an application 1306 configured in L3 mode. The switch 1302 includes the services insertion module 1304 to enable the features described herein. The switch 1302 also includes L3 interface 1308.

Figure 14:
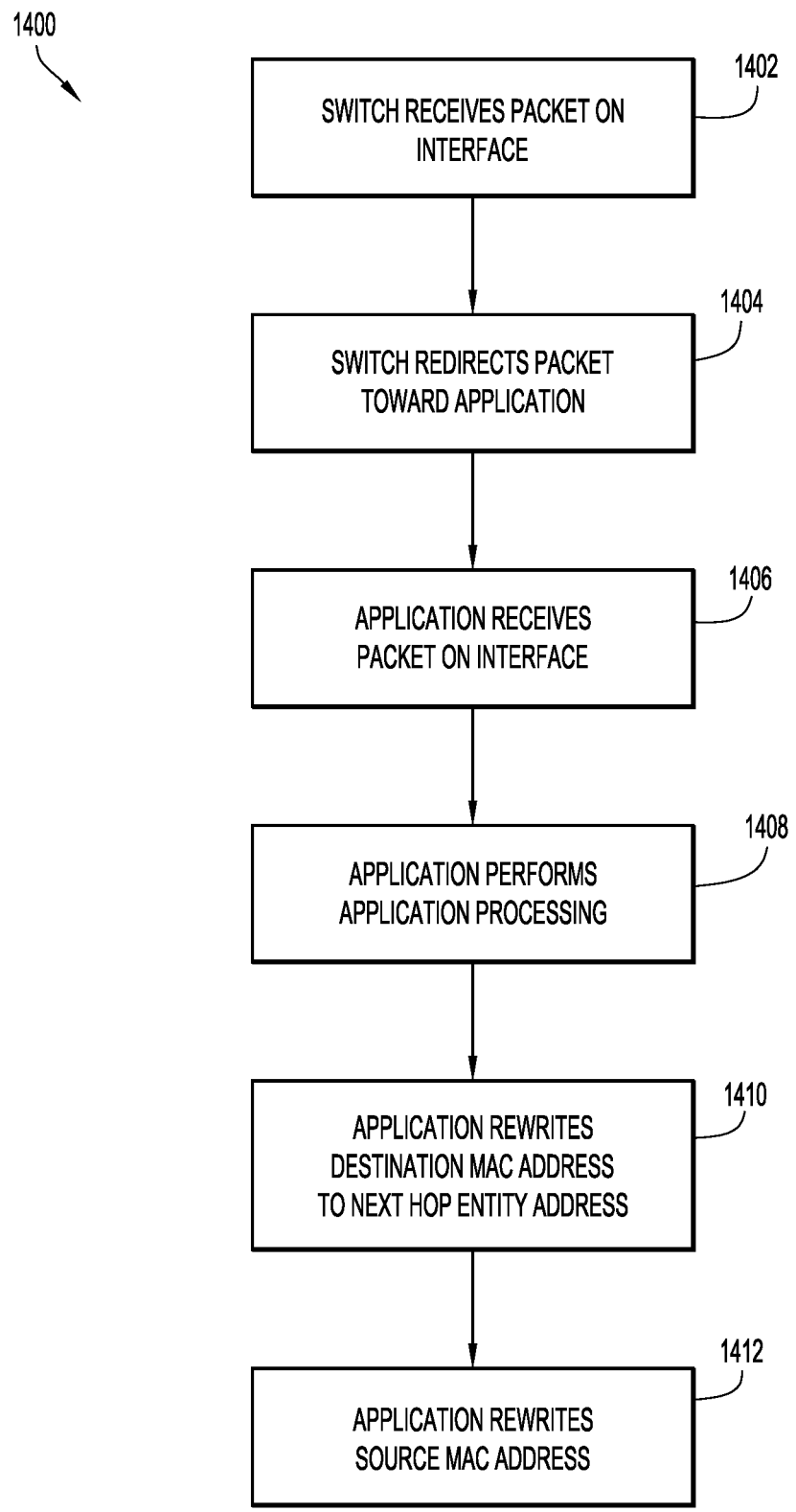
FIG. 14 is a flowchart of a method for the switch of FIG. 13 to forward network traffic to the application.

With regard to the data path, FIG. 14 is a flowchart of a method 1400 for the switch 1302 of FIG. 13 to forward network traffic to the application 1306. At 1402, the switch may initially receive the packet on an interface. At 1404, the switch 1302 may redirect the packet toward the application 1306 (e.g., by rewriting the destination MAC address to the MAC address of the application 1306). The source MAC address may be changed to the switch's 1302 routing MAC address. At 1406, the application 1306 receives the packet on an interface, and at 1408 performs application processing on the packet (e.g., Deep Packet Inspection (DPI), Wide Area Application Services (WAAS), Intrusion Prevention System (IPS), etc.). At 1410, the application 1306 may rewrite the destination MAC address to the next hop entity address. At 1412, the application 1306 may rewrite the source MAC address. For example, the application 1306 may rewrite the source MAC address from the MAC address of the switch 1302 to the MAC address of the application 1306.

Figure 15:
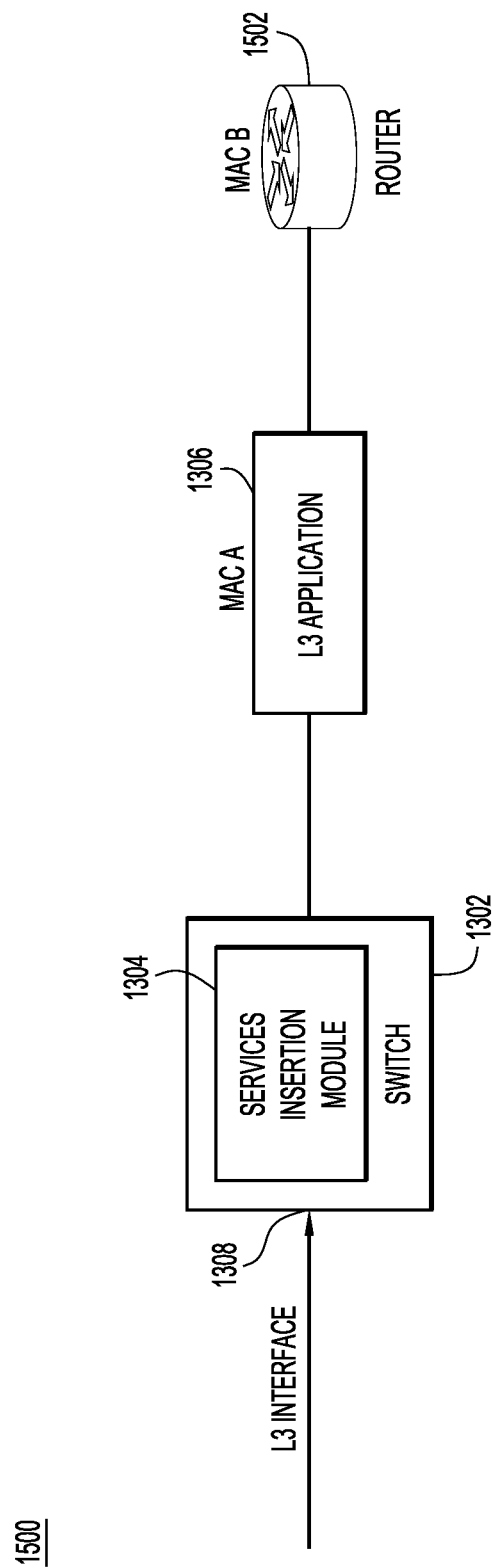
FIG. 15 is a block diagram of another network environment in which a switch in L3 mode is configured to forward network traffic to an application configured in L3 mode, according to an example embodiment.

As illustrated in FIG. 15, the application 1306 may rewrite the destination MAC address to the MAC address of the next hop entity (e.g., a router 1502). In this example, the application 1306 may rewrite the destination MAC address from $MAC_A$ (the MAC address of the application 1306) to $MAC_B$ (the MAC address of the router 1502). The application 1306 may rewrite the source MAC address from the MAC address of the switch 1302 to $MAC_A$.

Figure 16:
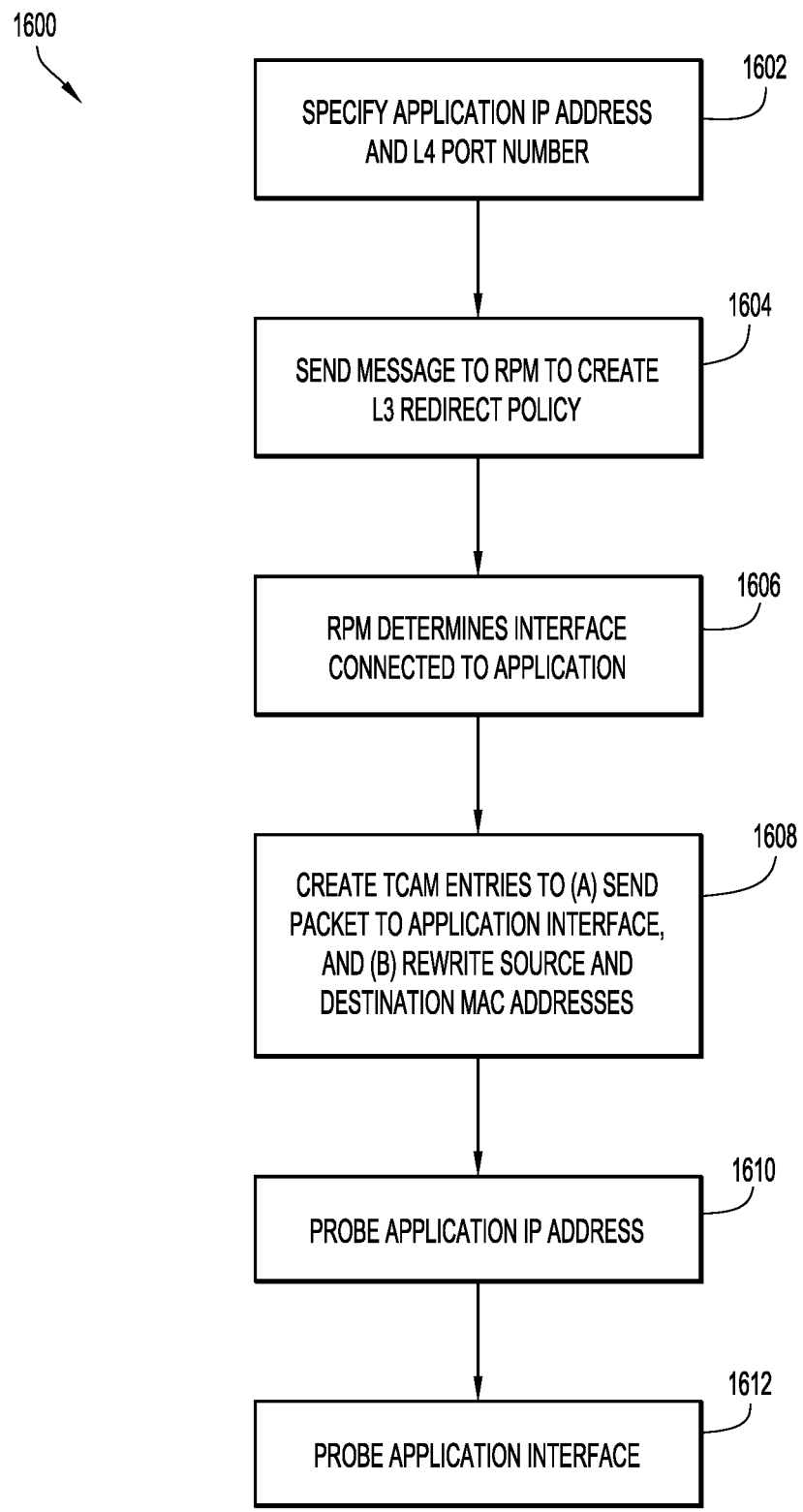
FIG. 16 is a flowchart of a method for the switch of FIG. 15 to monitor the health of the application and/or interface, according to an example embodiment.

With regard to the control path, FIG. 16 is a flowchart of an example method 1600 for the switch 1302 of FIG. 13 to monitor the health of the application 1306 and/or interface 1310 using the application IP address and (optionally) the L4 port number. At 1602, the application IP address and L4 porter number may be specified. In one example, the user may specify the application IP address and L4 port number. At 1604, the switch 1302 may create an L3 redirect policy (e.g., "if the network traffic matches a specified ACL, redirect the traffic to the IP address of the application"). For example, a service chaining module on the switch (e.g., service chaining module 1304) may send a message to a Route Processor Module (RPM) (described in more detail below in connection with FIG. 24) on the switch to create the L3 redirect policy. At 1606, the RPM may determine the interface connecting the switch 1302 and the application 1306 (e.g., using the switch's ARP and adjacency tables). The RPM may also obtain the application MAC address using the application IP address.

At 1608, TCAM entries may be created based on the above actions. The TCAM entries may provide, for example, that if the network traffic matches a specified ACL, (1) the traffic should be forwarded to the application interface, and (2) the source and destination MAC addresses should be rewritten. At 1610, the switch 1302 may probe the application IP address (and optionally the L4 port number), and at 1612, may also optionally probe the application interface.

Figure 17:
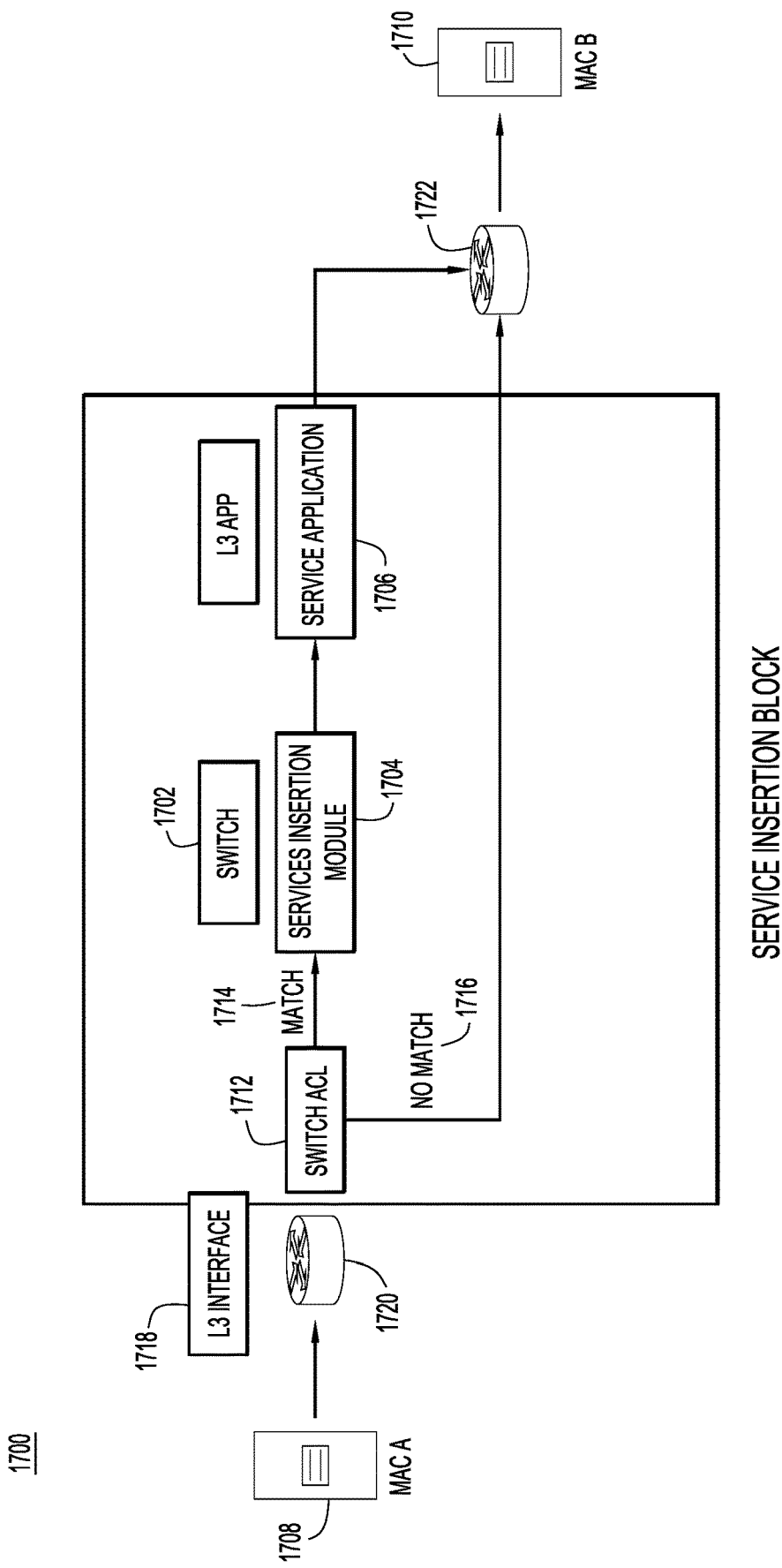
FIG. 17 is a block diagram of yet another network environment in which a switch in L3 mode is configured to forward network traffic to an application configured in L3 mode, according to an example embodiment.

FIG. 17 shows an example network environment 1700 in which a switch 1702 in L3 mode, which includes services insertion module 1704, is configured to forward network traffic to an application 1706 configured in L3 mode, according to an example embodiment. Also shown are endpoints 1708 and 1710 (both client and server hosts/networks). The switch 1702 and/or application 1706 may be directly connected to the client or workload, or may be connected to the client or workload through an infrastructure (e.g., routers, load balancers, etc.). Here, for example, the switch 1702 may receive network traffic at an L3 interface 1718 from router 1720. The switch 1702 may direct the network traffic received from the router 1720 to router 1722. FIG. 17 provides an example of how a client (e.g., endpoint 1708) may communicate with a server (e.g., endpoint 1710) on protocol A via an inserted service and on protocol B via a direct connection through the switch 1702. For example, depending on the protocol of the network traffic from the endpoint 1708 and received at the switch 1702, and one or more entries of switch ACL 1712 of the switch 1702, that network traffic may be directed (at 1714) to the application 1706 (e.g., if the protocol (and possibly other attributes) of the network traffic matches one or more of the switch ACL 1712 entries) and may be directed (at 1716) (e.g., if the protocol (and possibly other attributes) of the network traffic does not match one or more of the switch ACL 1712 entries) directly through the switch (without going to/through the application 1706). Since the L3 application always rewrites both source and destination MAC addresses, the MAC addresses may be rewritten when the packet is sent to the router 1722 after the application 1706, or when server (workload) is directly connected to the application 1706.

Figure 18:
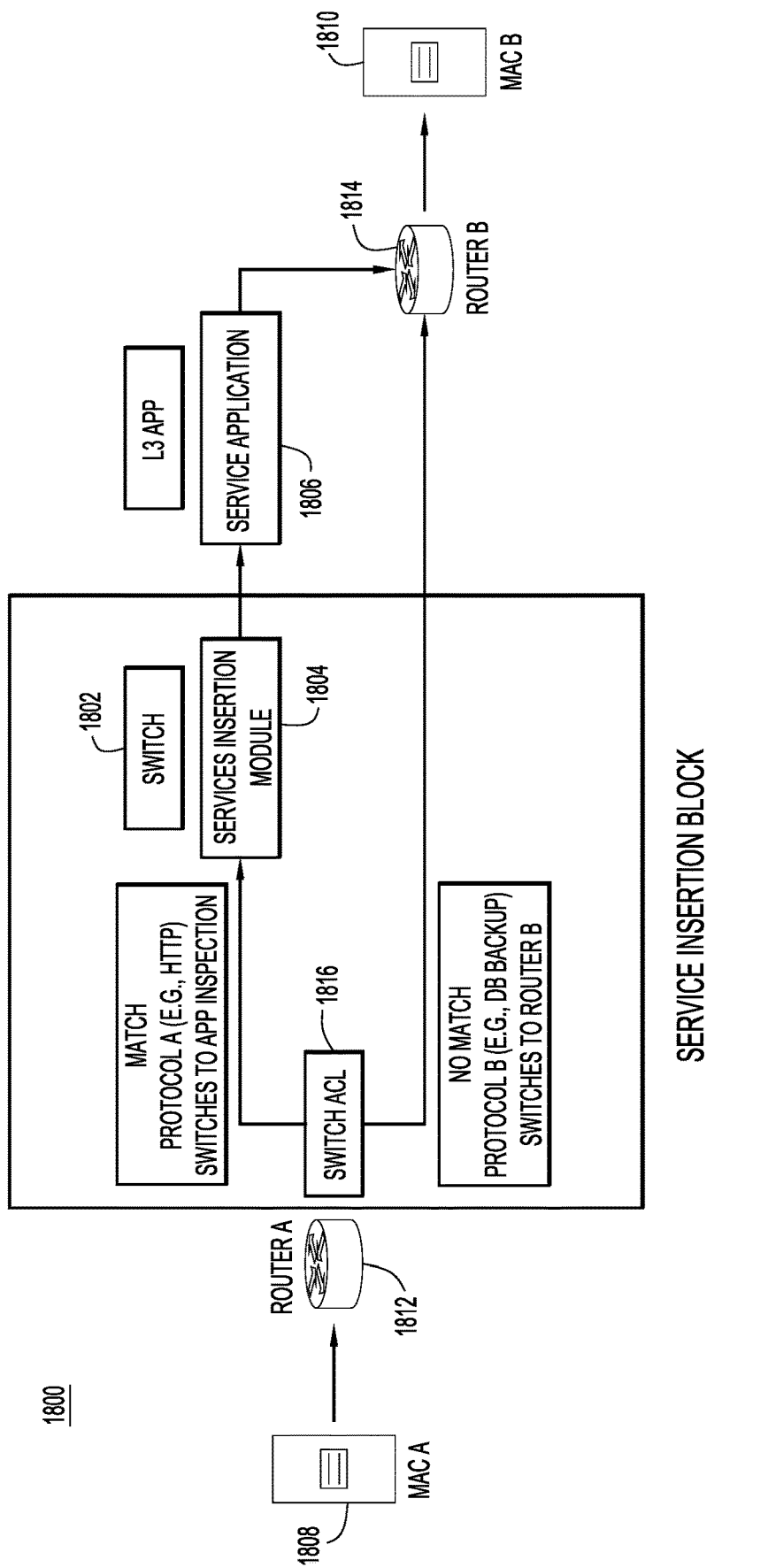
FIG. 18 shows an example network environment in which a switch in L3 mode is configured to forward network traffic to an application configured in L3 mode, according to an example embodiment.

FIG. 18 shows an example network environment 1800 in which a switch 1802 in L3 mode, which includes service insertion module 1804, is configured to forward network traffic to an application 1806 configured in L3 mode, according to an example embodiment. Also shown are endpoints 1808 and 1810, router A at 1812, and router B at 1814. The switch 1802 also includes a switch ACL 1816.

Figure 19:
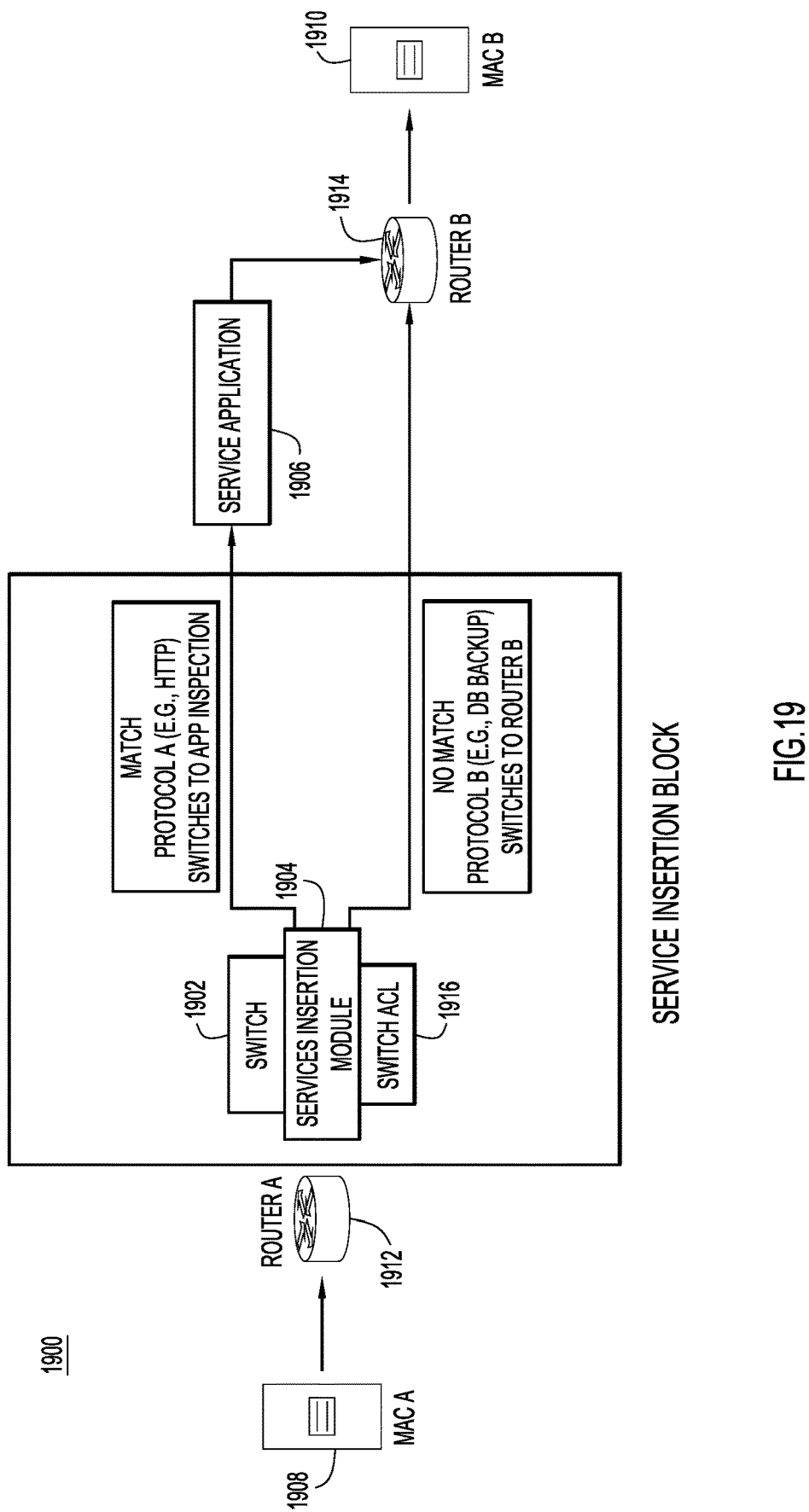
FIG. 19 shows an example network environment in which a switch in L3 mode is configured to forward network traffic to an application configured in L3 mode, according to an example embodiment.

FIG. 19 shows an example network environment 1900 in which a switch 1902 in L3 mode, which includes service insertion module 1904, is configured to forward network traffic to an application 1906 configured in L3 mode, according to an example embodiment. Also shown are endpoints 1908 and 1910, router A at 1912, router B at 1914, and switch ACL at 1916.

FIG. 20 is a block diagram of a network environment 2000 and illustrating various end host topologies before service insertion, according to an example embodiment. A first end host topology before service insertion is topology (Host A→B) 2002. Topology 2002, for example, includes client host A and server host B and does not include either router A or router B. A second end host topology before service insertion is topology (Host A→Rtr A→Host B) 2004. Topology 2004, for example, includes client host A, router (rtr) A, and server host B. A third end host topology before service insertion is topology (Host A→Rtr B→Host B) 2006. Topology 2006, for example, includes client host A, router B, and server host B. A fourth end host topology before service insertion is topology (Host A→Rtr A→Rtr B→Host B) 2008. Topology 2008, for example, includes client host A, router A, router B, and server host B. At 2010, four service insertion types are listed. At 2012, an example of Host A is shown (without router A), which may correspond to topology 2002 and/or 2006. At 2014, an example of Host A is shown with (in communication with) router A, which may correspond to topology 2004 and/or 2008. At both 2012 and 2014, Host A is shown as having the same MAC address (MAC A). At 2016, an example of Host B is shown (without router B), which may correspond to topology 2002 and/or 2004. At 2018, an example of Host B is shown with (in communication with) router B, which may correspond to topology 2006 and/or 2008. At both 2016 and 2018, Host B is shown as having the same MAC address (MAC B). After service insertion, for example, one or more of the listed service insertion types may exist between Host A and Host B.

Figure 21:
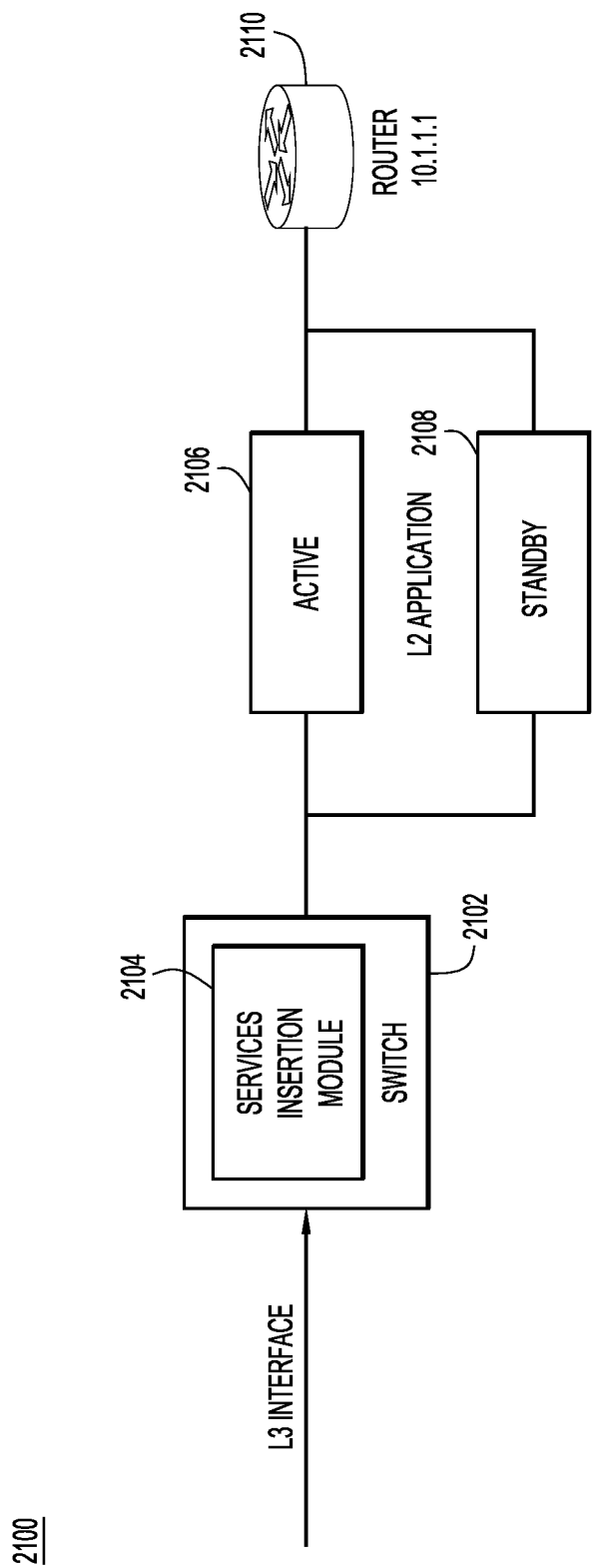
FIG. 21 is a block diagram of a network environment in which a switch in L3 mode is configured to forward network traffic to an application configured in L2 mode, according to an example embodiment.

FIG. 21 is a block diagram of a network environment 2100 in which a switch 2102 in L3 mode, which includes services insertion module 2104, is configured to forward network traffic to an application configured in L2 mode, according to an example embodiment. In this example, an L2 Application Native HA (stateful failover) method may be employed, which may be an alternate/addition to the example of FIG. 11. The switch 2102 includes the services insertion module 2104 to enable the features described herein. The application 2106 is active, and the application 2108 is in standby. The application 2108 may also be configured in L2 mode. The applications 2106 and 2108 may utilize an L2 Application Native HA (stateful failover) method. With regard to the data path, because the switch 2102 is configured in L3 mode, the switch 2102 may rewrite the destination and source MAC addresses of the packet. Because the application 2106 is configured in L2 mode, the application 2106 does not modify the packet header. With regard to the control path, the switch 2102 may monitor a path to the next-hop router (router 2110). As part of the L2 Application Native HA (stateful failover) method, the application 2106 itself may act to change the L2 path. The path follows the activate application; the standby application 2108 blocks the path from/through the standby application 2108. Applications 2106 and 2108 may be the same or different applications. For example, the services insertion module 2104 may monitor the path to the router 2110 that goes through the active application (application 2106). The standby application 2108 may block the path to the router 2110 from/through the standby application 2108. Optionally, the switch 2102 may be provided with the application IP address and L4 port to be monitored. If, for example, the standby application 2108 were to become active and the active application 2108 were to be in standby, the path would follow the (now) active application 2108.

Figure 22:
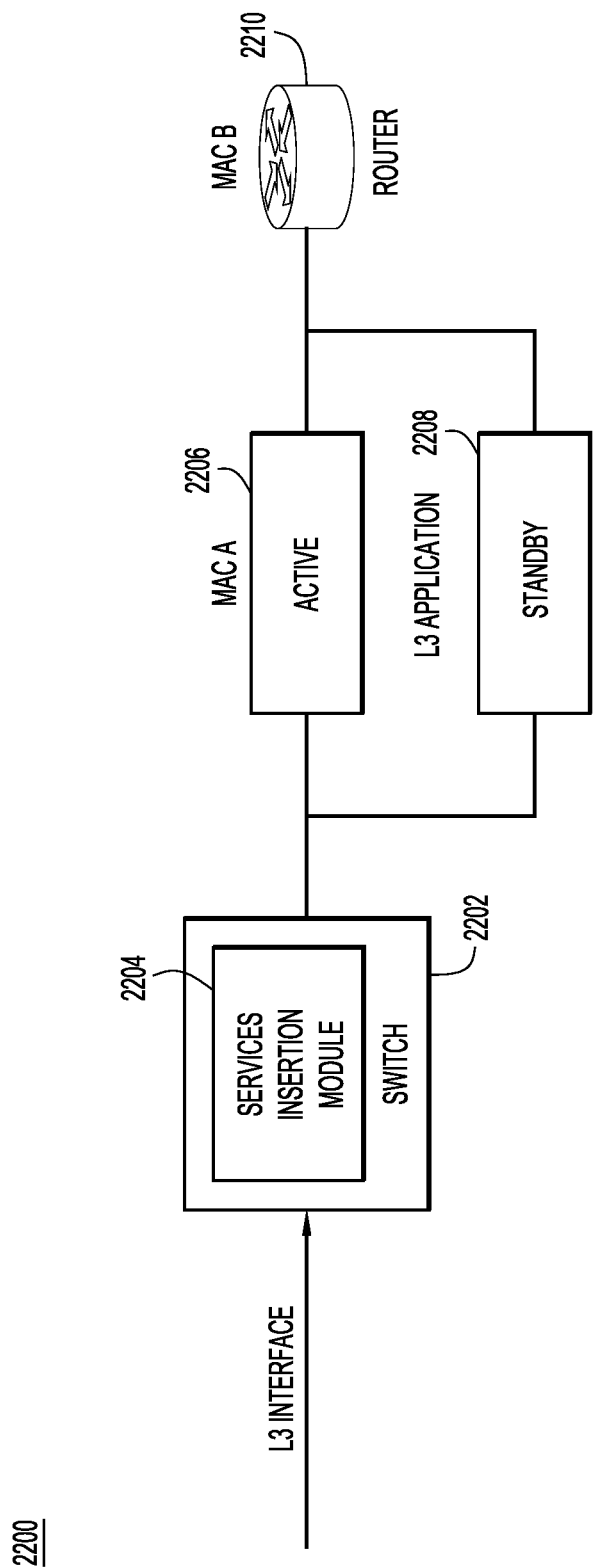
FIG. 22 is a block diagram of a network environment in which a switch in L3 mode is configured to forward network traffic to an application configured in L3 mode, according to an example embodiment.

FIG. 22 is a block diagram of a network environment 2200 in which a switch 2202 in L3 mode, which includes services insertion module 2204, is configured to forward network traffic to an application 2206 configured in L3 mode, according to an example embodiment. In this example, a L3 Application Native HA (stateful failover) method may be employed, which may be an alternative/addition to the example of FIG. 15. The switch 2202 includes the services insertion module 2204 to enable the features described herein. The application 2206 is active, and the application 2208 is in standby. The application 2208 may also be configured in L2 mode. The applications 2206 and 2208 may utilize a L3 Application Native HA (stateful failover) method. With regard to the data path, because the switch 2202 is configured in L3 mode, the switch 2202 may rewrite the destination and source MAC addresses of the packet. Because the application 2206 is configured in L3 mode, the application 2206 may rewrite the destination and source MAC addresses of the packet. For example, the application 2206 may rewrite the source MAC address to its own MAC address, $MAC_A$, and may rewrite the destination MAC address to the MAC address, $MAC_B$, of router 2210. As part of the L3 Application Native HA (stateful failover) method, for example, the application 2206 itself acts to change the L2 path.

Figure 23:
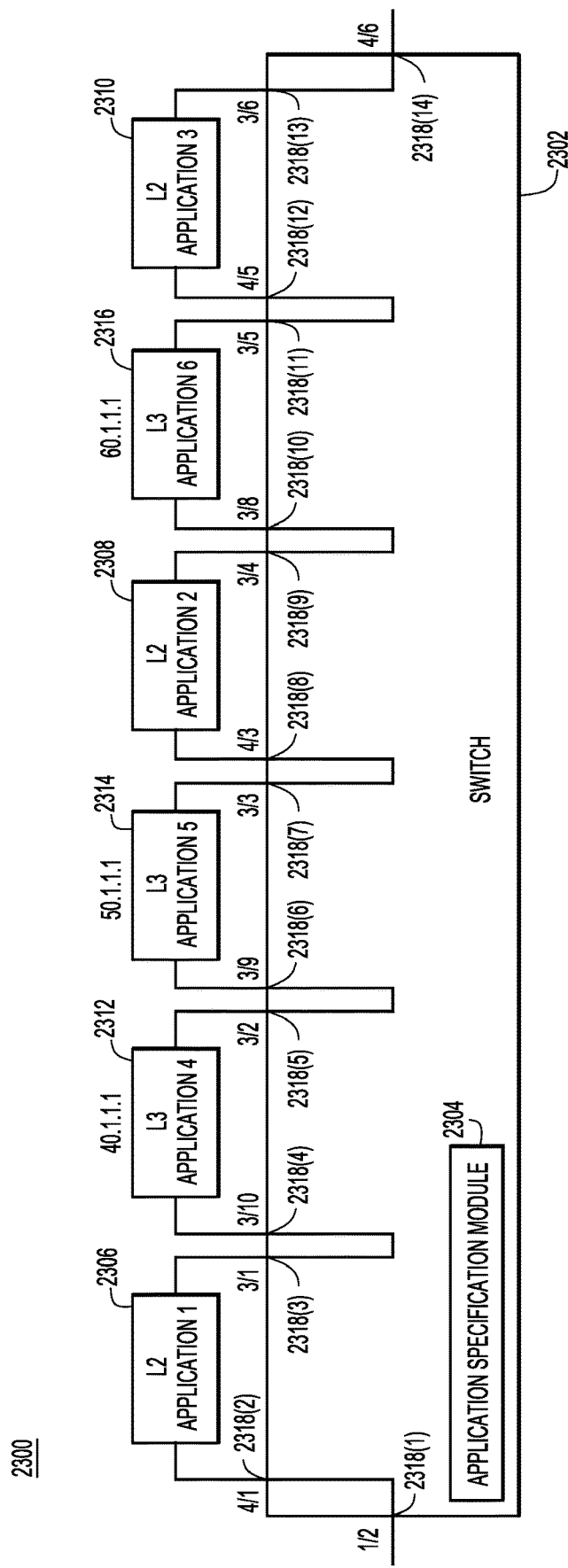
FIG. 23 is another block diagram of a network environment in which a switch is configured to specify applications in a service chain using Layer 2 and Layer 3 modes, according to an example embodiment.

FIG. 23 illustrates another example multi-mode configuration, according to an example embodiment. The network environment 2300 includes a switch 2302 and the six applications (Applications 1-6). Application 1 is identified by reference numeral 2306, Application 2 is identified by reference numeral 2308, Application 3 is identified by reference numeral 2310, Application 4 is identified by reference numeral 2312, Application 5 is identified by reference numeral 2314, and Application 6 is identified by reference numeral 2316. The switch 2302 includes a number of interfaces (or ports). In this example, the switch 2302 includes interfaces eth 1/2 2318(1), eth 4/1 2318(2), eth 3/1 2318(3), eth 3/10 2318(4), eth 3/2 2318(5), eth 3/9 2318(6), eth 3/3 2318(7), eth 4/3 2318(8), eth 3/4 2318(9), eth 3/8 2318(10), eth 3/5 2318(11), eth 4/5 2318(12), eth 3/6 2318(13), and eth 4/6 2318(14). In this example, Applications 1-3 are specified using L2 mode, and Applications 4-6 are specified using L3 mode. More specifically, Application 1 is specified by eth 4/1 (egress from switch); Application 4 is specified by IP address 40.1.1.1; Application 5 is specified by IP address 50.1.1.1; Application 2 is specified by eth 4/3 (egress from switch); Application 6 is specified by IP address 60.1.1.1; and Application 3 is specified by eth 4/5 (egress from switch). As such, Applications 1-3 are specified using transparent mode, and Applications 4-6 are specified using routed mode. The interfaces eth 1/2, eth 3/3, and eth 3/5, for example, are L2 or switched interfaces. The interfaces eth 3/1, eth 3/2, and eth 3/4, for example, are L3 or routed interfaces. In this example, there are three device groups and three port groups (employed in service chaining in the forward direction of network traffic), each containing one application. This is enabled by the application specification module 2304 running on the switch 2302. Example Command Line Interface (CLI) commands for the multi-mode configuration of FIG. 23 are listed below:

```
Nexus9k-79(config-catena) # show ip access-lists
IP access list PBR_Forward
  10 permit ip any 10.10.20.0/24
IP access list PBR_Reverse
  10 permit ip 10.10.20.0/24 any
Nexus9k-79(config-catena)# show run catena
!Command: show running-config catena
!Time: Tue Sep 5 08:06:22 2017
version 7.0(3)I7(1)
feature catena
catena device-group DG1
  node ip 40.1.1.1
catena device-group DG2
  node ip 50.1.1.1
catena device-group DG3
  node ip 60.1.1.1
catena port-acl Forward
  10 deny ip 192.168.10.0 255.255.255.0 192.168.20.0 255.255.255.0
  20 permit ip 10.10.10.0/24 10.10.20.0/24
catena port-acl Reverse
  10 deny ip 192.168.20.0 255.255.255.0 192.168.10.0 255.255.255.0
  20 permit ip 10.10.20.0/24 10.10.10.0/24
catena port-group L2-pg1
  interface Eth1/2
catena port-group L2-pg2
  interface Eth4/1
catena port-group L3-pg11
  interface Eth3/1
catena port-group L3-pg22
  interface Eth3/2
catena port-group L2-pg3
  interface Eth3/3
catena port-group L23-pg4
  interface Eth4/3
catena port-group L3-pg33
  interface Eth3/4
catena port-group L2-pg5
  interface Eth3/5
catena port-group L23-pg6
  interface Eth4/5
catena port-group L2-pg7
  interface Eth3/6
catena port-group L2-pg8
  interface Eth4/6
catena port-group L2-pgrev1
  interface Eth3/8
catena port-group L3-pgr44
  interface Eth3/9
catena port-group L2-pgrev2
  interface Eth3/10
catena Instance_L2&L3_Forward
  chain 10
    10 access-list Forward ingress-port-group L2-pg1 egress-port-group L2-pg2 mode forward
    20 access-list PBR_Forward ingress-port-group L3-pg11 egress-
```

-continued

```
    device-group DG1 mode forward
    30 access-list PBR_Forward ingress-port-group L3-pg22 egress-
      device-group DG2 mode forward
    40 access-list Forward ingress-port-group L2-pg3 egress-port-group
      L23-pg4 mode forward
    50 access-list PBR_Forward ingress-port-group L3-pg33 egress-
      device-group DG3
      mode forward
    60 access-list Forward ingress-port-group L2-pg5 egress-port-group
      L23-pg6 mode forward
    70 access-list Forward ingress-port-group L2-pg7 egress-port-group
      L2-pg8 mode forward
    no shutdown
catena Instance_L2&L3_Reverse
  chain 10
    10 access-list Reverse ingress-port-group L2-pg8 egress-port-group
      L2-pg7 mode forward
    20 access-list PBR_Reverse ingress-port-group L23-pg6 egress-
      device-group DG3 mode forward
    30 access-list Reverse ingress-port-group L2-pgrev1 egress-port-
      group L3-pg33 mode forward
    40 access-list PBR_Reverse ingress-port-group L23-pg4 egress-
      device-group DG2 mode forward
    50 access-list PBR_Reverse ingress-port-group L3-pgr44 egress-
      device-group DG1 mode forward
    60 access-list Reverse ingress-port-group L2-pgrev2 egress-port-
      group L3-pg11 mode forward
    70 access-list Reverse ingress-port-group L2-pg2 egress-port-group
      L2-pg1 mode forward
    no shutdown
```

In this example, the network traffic proceeds in the service chain in the forward (not the reverse) direction. As specified in the CLI above, if the traffic matches "access-list Forward," and if the traffic arrives on ingress-port-group L2-pg1, the traffic is forwarded to egress-port-group L2-pg2. Here, ingress-port-group L2-pg1 includes Eth 1/2, and egress-port-group L2-pg2 includes Eth 4/1. Thus, as shown in FIG. 23, the traffic (which matches access-list Forward) arrives at Eth 1/2 and is forwarded to Application 1 at Eth 4/1 (e.g., in L2 mode).

As further specified in the CLI above, if the traffic matches "access-list PBR_Forward," and if the traffic arrives on ingress-port-group L3-pg11, the traffic is forwarded to egress-device-group DG1. Here, ingress-port-group L3-pg11 includes Eth 3/1, and egress-device-group DG1 includes node ip 40.1.1.1. Thus, as shown in FIG. 23, the traffic (which matches access-list PBR_Forward) arrives at Eth 3/1 and is forwarded to Application 4 at IP address 40.1.1.1 (e.g., in L3 mode). In same way, the traffic is forwarded to all the other L2 and L3 applications (e.g., until it exits the service chain and reaches the end point (server host/network)). In a similar way, the server response traffic is forwarded in reverse direction (e.g., until it exits the service chain and reaches the end point client host). For example, for the server response traffic (which, here, corresponds to the reverse direction), as specified in the CLI above, if the traffic matches "access-list Reverse," and if the traffic arrives on ingress-port-group L2-pg8, the traffic is forwarded to egress-port-group L2-pg7. Here, ingress-port-group L2-pg8 includes Eth 4/6, and egress-port-group L2-pg7 includes Eth 3/6. Thus, for the reverse direction, the traffic (which matches access-list Reverse) arrives at Eth 4/6 and is forwarded to Application 3 at Eth 3/6 (e.g., in L2 mode).

As further specified in the CLI above, for the reverse direction, if the traffic matches "access-list PBR_Reverse," and if the traffic arrives on ingress-port-group L23-pg6, the traffic is forwarded to egress-device-group DG3. Here, ingress-port-group L23-pg6 includes Eth 4/5, and egress-device-group DG3 includes node ip 60.1.1.1. Thus, the traffic (which matches access-list PBR_Reverse) arrives at Eth 4/5 and is forwarded to Application 6 at IP address 60.1.1.1 (e.g., in L3 mode). The traffic may also be forwarded to the other applications (e.g., in L2 and L3 modes) as the traffic proceeds through the service chain.

Figure 24:
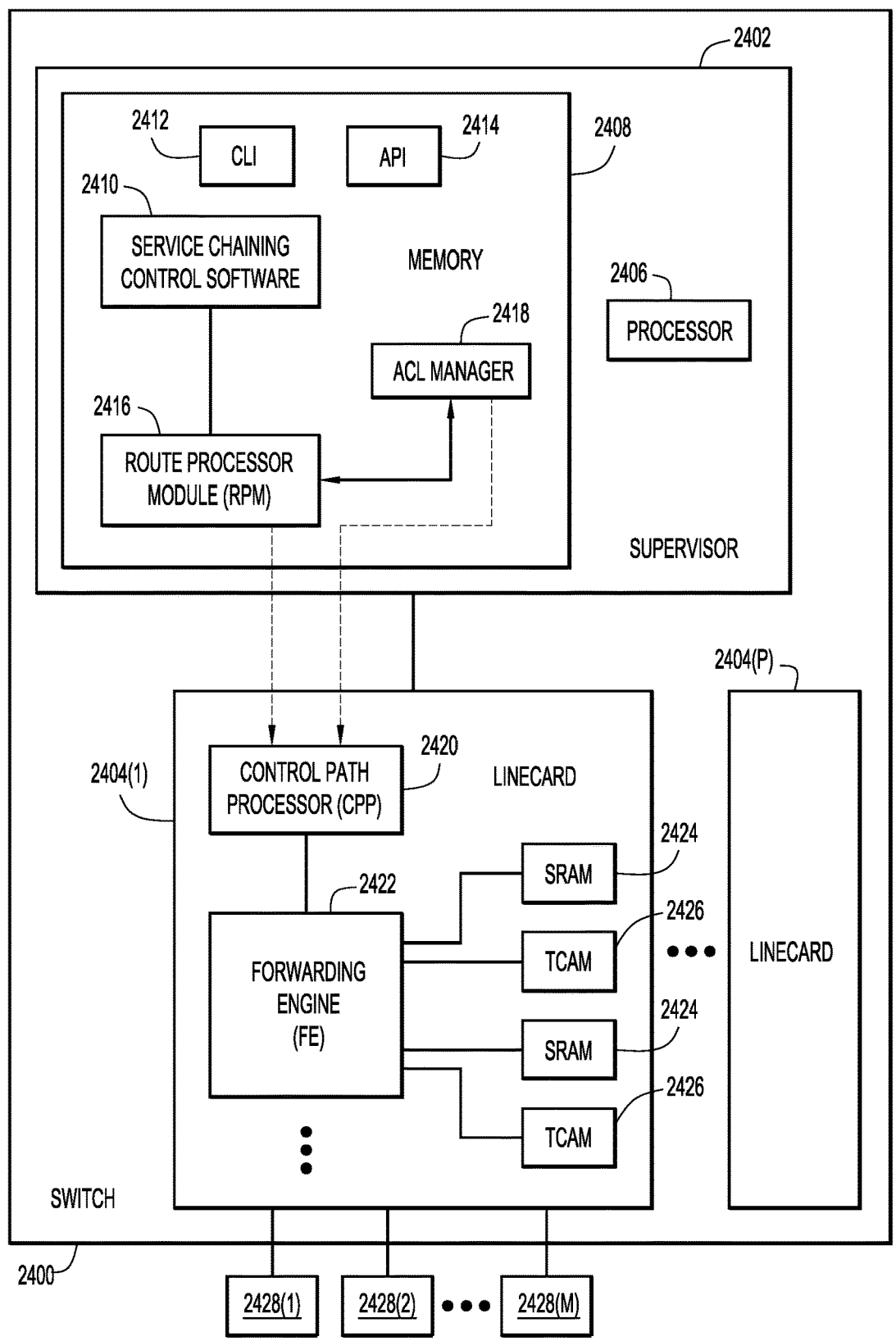
FIG. 24 is a block diagram of a switch configured to specify applications in a service chain using one or more modes and/or to forward network traffic to a hybrid service in a service chain, according to an example embodiment.

FIG. 24 is a block diagram of an example switch 2400 configured for hybrid services insertion (multi-mode application service chaining), according to an example embodiment. The switch includes a supervisor module 2402 and a plurality of linecards 2404(1)-2404(P). The supervisor module 2402 includes a processor (e.g., microprocessor or microcontroller) 2406 and memory 2408. The supervisor 2402 includes various software modules, including a service chaining module 2410. The service chaining module 2410 is configured to communicate with a user interface (e.g., CLI) 2412, an Application Programming Interface (API) 2414 to make the CLI 2412 available outside of the switch (e.g., Nx-API), and a Route Process Manager (RPM) 2416 configured to communicate with an ACL manager 2418. The linecards 2404(1)-2404(P) each include a Control Path Processor (CPP) 2420 configured to program a plurality of Forwarding Engines (FEs) 2422, which are hardware ASICs. Each FE 2422 in a linecard is associated with respective Static Random Access Memories (SRAMs) 2424 and TCAMs 2426. Traffic enters to the switch 2400 at one of a plurality of network ports 2428(1)-2428(M) of a given linecard 2404(1)-2404(P), and leaves the switch via one of the plurality of network ports 2428(1)-2428(M) of a given linecard 2404(1)-2404(P).

The service chaining module 2410 may be configured to perform selective traffic redirection based on ACL configuration, and may perform the functions of an application specification module (e.g., one or more of the application specification modules shown in FIGS. 1, 2, 3, and 23) and/or a services insertion module (e.g., one or more of the services insertion modules shown in FIGS. 5-7, 9, 11-13, 15, 17-19, 21 and 22). The service chaining module 2410 may perform techniques described herein by causing the RPM 2416 and ACL manager 2418 to configure the linecards 2404(1)-2404 (P) by communicating with the CPPs 2420. The CPPs 2420 may program the FEs 2422 in accordance with the examples provided herein. The FEs 2422 communicate with TCAMs 2426, which may store respective match ACLs, and the SRAM 2424 may store the action to be taken if there is a match (e.g., to which switch interface (to which an application is connected) to forward a network packet). The hardware entries described herein (e.g., described above in relation to FIGS. 10 and 16) may be created in the TCAM 2426 and/or SRAM 2424 (or converted to TCAM 2426 and/or SRAM 2424 configurations).

The software modules on the supervisor 2404 may be implemented on at least one memory 2408 and at least one processor 2406. The memory 2408 may comprise read only memory (ROM), random access memory (RAM), magnetic disk storage media devices, optical storage media devices, flash memory devices, electrical, optical, or other physical/tangible memory storage devices. Thus, in general, the memory 2408 may comprise one or more tangible (non-transitory) computer readable storage media (e.g., a memory device) encoded with software comprising computer executable instructions and when the software is executed (by the controller) it is operable to perform the operations described herein.

In one form, a method is provided comprising: storing, in at least one hardware module of a network device having a plurality of ports, attributes for at least one access control list and associated actions that cause network packets received at one of the plurality of ports that match the attributes for the at least one access control list, to be directed into a service chain that includes at least a first network processing application specified according to a port and a second network processing application specified according to an internet protocol (IP) address; and directing a received network packet that matches the attributes for the at least one access control list into the service chain.

Storing may comprise storing, in the at least one hardware module, attributes to define one or more port groups, each port group specifying at least one ingress port to the network device and/or at least one egress port from the network device. The directing may comprise directing the received network packet to a port group of the one or more port groups, the port group comprising the port according to which the first network processing application is specified. The directing may comprise directing the received network packet without modifying a source address or a destination address of a header of the received network packet.

Storing may comprise storing, in the at least one hardware module, attributes to define one or more devices groups, each device group specifying an internet protocol (IP) address of a network processing application. Directing may comprise directing the received network packet to a device group of the one or more devices groups, the device group comprising the IP address according to which the second network processing application is specified. Directing may comprise modifying a source address and/or a destination address of a header of the received network packet, the source address being modified to an address associated with the network device and/or the destination address being modified to an address associated with the second network processing application. Modifying may comprise rewriting the destination address to a first media access control (MAC) address associated with the second network processing application and/or rewriting the source address to a second MAC address associated with the network device.

The port may be a physical port of the network device at which network packets are directed from the network device to the first network processing application.

The IP address may be an IP address of a device running the second network processing application.

In another form, an apparatus is provided comprising: at least one hardware module of a network device having a plurality of ports, the at least one hardware module configured to store attributes for at least one access control list and associated actions that cause network packets received at one of the plurality of ports that match the attributes for the at least one access control list, to be directed into a service chain that includes at least a first network processing application specified according to a port and a second network processing application specified according to an internet protocol (IP) address; and a processor configured to communicate with the at least one hardware module and to direct a received network packet that matches the attributes for the at least one access control list into the service chain.

The attributes may define one or more port groups, each port group specifying at least one ingress port to the network device and/or at least one egress port from the network device. The processor may be configured to direct the received network packet to a port group of the one or more port groups, the port group comprising the port according to which the first network processing application is specified. The processor may be configured to direct the received network packet without modifying a source address or a destination address of a header of the received network packet.

The processor may be configured to direct the received network packet to a device group of the one or more devices groups, the device group comprising an IP address according to which the second network processing application is specified.

In still another form, provided is one or more non-transitory computer readable storage media encoded with instructions that, when executed by a processor, cause the processor to: store, in at least one hardware module of a network device having a plurality of ports, attributes for at least one access control list and associated actions that cause network packets received at one of the plurality of ports that match the attributes for the at least one access control list, to be directed into a service chain that includes at least a first network processing application specified according to a port and a second network processing application specified according to an internet protocol (IP) address; and direct a received network packet that matches the attributes for the at least one access control list into the service chain.

The one or more non-transitory computer readable storage media of claim 16, wherein the attributes define one or more port groups, each port group specifying at least one ingress port to the network device and/or at least one egress port from the network device.

The instructions, when executed by the processor, may cause the processor to direct the received network packet to a port group of the one or more port groups, the port group comprising the port according to which the first network processing application is specified. The instructions, when executed by the processor, may cause the processor to direct the received network packet without modifying a source address or a destination address of a header of the received network packet.

The instructions, when executed by the processor, may cause the processor to direct the received network packet to a device group of the one or more devices groups, the device group comprising an IP address according to which the second network processing application is specified.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    storing, in at least one hardware memory module of a network device having a plurality of ports, attributes for at least one access control list and associated actions that cause network packets received at one of the plurality of ports that match the attributes for the at least one access control list, to be directed into a service chain that includes at least a first network processing application and a second network processing application, the network device being selectively configurable in one of a layer 2 mode or a layer 3 mode, the first network processing application being configured in the layer 2 mode and specified according to a physical port of the plurality of ports of the network device, the second network processing application being configured in the layer 3 mode and specified according to an internet protocol (IP) address; and directing a received network packet that matches the attributes for the at least one access control list into the service chain, wherein directing comprises:
  when the network device is in the layer 2 mode, directing the received network packet to the first network processing application and the second network processing application without the network device modifying a destination address in a header of the received network packet, and
  when the network device is in the layer 3 mode,
    modifying the destination address in the header of the received network packet to an address associated with one of the first network processing application or the second network processing application to produce a modified network packet, and
    directing the modified network packet to the one of the first network processing application or the second network processing application and, from the one of the first network processing application or the second network processing application to another of the first network processing application or the second network processing application.

2. The method of claim 1, wherein storing comprises storing, in the at least one hardware memory module, attributes to define one or more port groups, each port group specifying at least one of at least one ingress port to the network device or at least one egress port from the network device.

3. The method of claim 2, wherein directing the received network packet that matches the attributes for the at least one access control list into the service chain further comprises directing the received network packet to a particular port group of the one or more port groups, the particular port group comprising the physical port according to which the first network processing application is specified.

4. The method of claim 1, wherein, when the network device is in the layer 2 mode, directing the received network packet to the first network processing application and the second network processing application further comprises directing the received network packet without the network device modifying a source address in the header of the received network packet.

5. The method of claim 1, wherein storing comprises storing, in the at least one hardware memory module, attributes to define one or more device groups, each device group specifying an internet protocol (IP) address of a network processing application.

6. The method of claim 5, wherein directing the received network packet that matches the attributes for the at least one access control list into the service chain further comprises directing the received network packet to a particular device group of the one or more device groups, the particular device group comprising the IP address according to which the second network processing application is specified.

7. The method of claim 1, wherein, when the network device is in the layer 3 mode, directing the received network packet into the service chain further comprises modifying a source address in the header of the received network packet to an address associated with the network device.

8. The method of claim 7, wherein modifying the destination address comprises rewriting the destination address to a first media access control (MAC) address associated with the one of the first network processing application or the second network processing application, and modifying the source address comprises rewriting the source address to a second MAC address associated with the network device.

9. The method of claim 1, wherein the IP address is an IP address of a device running the second network processing application.

10. An apparatus comprising:
  at least one hardware memory module of a network device having a plurality of ports, the at least one hardware memory module configured to store attributes for at least one access control list and associated actions that cause network packets received at one of the plurality of ports that match the attributes for the at least one access control list, to be directed into a service chain that includes at least a first network processing application and a second network processing application, the network device being selectively configurable in one of a layer 2 mode or a layer 3 mode, the first network processing application being configured in the layer 2 mode and specified according to a physical port of the plurality of ports of the network device, the second network processing application being configured in the layer 3 mode and specified according to an internet protocol (IP) address; and
  a processor configured to communicate with the at least one hardware memory module and to direct a received network packet that matches the attributes for the at least one access control list into the service chain, wherein directing comprises:
    when the network device is in the layer 2 mode, directing the received network packet to the first network processing application and the second network processing application without the network device modifying a destination address in a header of the received network packet, and
    when the network device is in the layer 3 mode,
      modifying the destination address in the header of the received network packet to an address associated with one of the first network processing application or the second network processing application to produce a modified network packet, and
      directing the modified network packet to the one of the first network processing application or the second network processing application and, from the one of the first network processing application or the second network processing application to another of the first network processing application or the second network processing application.

11. The apparatus of claim 10, wherein the attributes for the at least one access control list define one or more port groups, each port group specifying at least one of at least one ingress port to the network device or at least one egress port from the network device.

12. The apparatus of claim 11, wherein the processor is further configured to direct the received network packet to a particular port group of the one or more port groups, the particular port group comprising the physical port according to which the first network processing application is specified.

13. The apparatus of claim 10, wherein the processor is further configured to, when the network device is in the layer 2 mode, direct the received network packet without the network device modifying a source address in the header of the received network packet.

14. The apparatus of claim 10, wherein the processor is further configured to direct the received network packet to a particular device group of one or more device groups, the particular device group comprising the IP address according to which the second network processing application is specified.

15. One or more non-transitory computer readable storage media encoded with instructions that, when executed by a processor, cause the processor to:

store, in at least one hardware memory module of a network device having a plurality of ports, attributes for at least one access control list and associated actions that cause network packets received at one of the plurality of ports that match the attributes for the at least one access control list, to be directed into a service chain that includes at least a first network processing application and a second network processing application, the network device being selectively configurable in one of a layer 2 mode or a layer 3 mode, the first network processing application being configured in the layer 2 mode and specified according to a physical port of the plurality of ports of the network device, the second network processing application being configured in the layer 3 mode and specified according to an internet protocol (IP) address; and direct a received network packet that matches the attributes for the at least one access control list into the service chain, wherein directing comprises:

when the network device is in the layer 2 mode, directing the received network packet to the first network processing application and the second network processing application without the network device modifying a destination address in a header of the received network packet, and when the network device is in the layer 3 mode,
modifying the destination address in the header of the received network packet to an address associated with one of the first network processing application or the second network processing application to produce a modified network packet, and directing the modified network packet to the one of the first network processing application or the second network processing application and, from the one of the first network processing application or the second network processing application to another of the first network processing application or the second network processing application.

16. The one or more non-transitory computer readable storage media of claim 15, wherein the attributes for the at least one access control list define one or more port groups, each port group specifying at least one of at least one ingress port to the network device or at least one egress port from the network device.

17. The one or more non-transitory computer readable storage media of claim 16, wherein the instructions, when executed by the processor, further cause the processor to direct the received network packet to a particular port group of the one or more port groups, the particular port group comprising the physical port according to which the first network processing application is specified.

18. The one or more non-transitory computer readable storage media of claim 15, wherein the instructions, when executed by the processor, further cause the processor to, when the network device is in the layer 2 mode, direct the received network packet without modifying a source address address in the header of the received network packet.

19. The one or more non-transitory computer readable storage media of claim 15, wherein the instructions, when executed by the processor, further cause the processor to direct the received network packet to a particular device group of one or more device groups, the particular device group comprising an IP address according to which the second network processing application is specified.

20. The apparatus of claim 10, wherein the IP address is an IP address of a device running the second network processing application.

* * * * *